United States Patent
Aldana et al.

(10) Patent No.: US 10,637,759 B2
(45) Date of Patent: Apr. 28, 2020

(54) METHODS AND SYSTEMS FOR ENHANCED ROUND TRIP TIME (RTT) EXCHANGE

(71) Applicant: QUALCOMM Incorporated, San Diego, CA (US)

(72) Inventors: Carlos Horacio Aldana, Mountain View, CA (US); Sandip Homchaudhuri, San Jose, CA (US); Xin He, Sunnyvale, CA (US); Xiaoxin Zhang, Sunnyvale, CA (US); Ashish Kumar Shukla, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/160,887

(22) Filed: Oct. 15, 2018

(65) Prior Publication Data
US 2019/0052557 A1 Feb. 14, 2019

Related U.S. Application Data

(63) Continuation of application No. 15/625,671, filed on Jun. 16, 2017, now Pat. No. 10,129,120, which is a
(Continued)

(51) Int. Cl.
*H04L 12/26* (2006.01)
*G01S 5/00* (2006.01)
(Continued)

(52) U.S. Cl.
CPC ............ *H04L 43/0864* (2013.01); *G01S 5/00* (2013.01); *G01S 5/0072* (2013.01); *G01S 5/06* (2013.01);
(Continued)

(58) Field of Classification Search
CPC .... H04L 43/0864; H04L 5/005; H04W 4/029; H04W 4/30; H04W 4/043; H04W 24/00;
(Continued)

(56) References Cited

U.S. PATENT DOCUMENTS 6,643,612 B1 11/2003 Lahat et al.
6,831,909 B1 12/2004 Koo et al.
(Continued)

FOREIGN PATENT DOCUMENTS

JP 2000197097 A 7/2000
JP 2009505060 A 2/2009
(Continued)

OTHER PUBLICATIONS

Aldana et al, CIDs 46,47,48 Regarding Fine Timing Measurement, Jan. 2013, IEEE P802.11 Wireless LANs, 11-12-1249-03-000m. (Year: 2013).*
(Continued)

*Primary Examiner* — Shailendra Kumar
(74) *Attorney, Agent, or Firm* — Thien T. Nguyen

(57) ABSTRACT

Disclosed are systems, methods and devices for obtaining round trip time measurements for use in location based services. In particular implementations, a fine timing measurement request message wirelessly transmitted by a first transceiver device to a second transceiver device may permit additional processing features in computing or applying a signal round trip time measurement. The fine timing measurement may include one or more files specifying a requested number of fine timing measurement messages requested for transmission from the first wireless transceiver device in response to fine timing measurement request message. Such a signal round trip time measurement may be used in positioning operations.

12 Claims, 39 Drawing Sheets

Related U.S. Application Data continuation of application No. 14/285,594, filed on May 22, 2014, now Pat. No. 9,699,052.

(60) Provisional application No. 61/829,204, filed on May 30, 2013, provisional application No. 61/846,523, filed on Jul. 15, 2013, provisional application No. 61/859,275, filed on Jul. 28, 2013, provisional application No. 61/867,593, filed on Aug. 19, 2013, provisional application No. 61/899,796, filed on Nov. 4, 2013, provisional application No. 61/937,435, filed on Feb. 7, 2014.

(51) Int. Cl.
    *H04W 64/00*     (2009.01)
    *G01S 5/06*     (2006.01)
    *H04W 4/029*     (2018.01)
    *G01S 13/76*     (2006.01)
    *H04W 24/00*     (2009.01)
    *H04W 4/30*     (2018.01)
    *H04L 5/00*     (2006.01)
    *H04W 72/08*     (2009.01)
    *H04W 76/10*     (2018.01)

(52) U.S. Cl.
    CPC ........... *G01S 13/767* (2013.01); *H04W 4/029* (2018.02); *H04W 4/30* (2018.02); *H04W 24/00* (2013.01); *H04W 64/00* (2013.01); *H04L 5/005* (2013.01); *H04W 72/082* (2013.01); *H04W 76/10* (2018.02)

(58) Field of Classification Search
    CPC ... H04W 64/00; H04W 76/10; H04W 72/082; G01S 5/06; G01S 5/0072; G01S 13/767; G01S 5/00
    See application file for complete search history.

(56) References Cited

U.S. PATENT DOCUMENTS

| | | | |
|---|---|---|---|
| 8,781,492 | B2 | 7/2014 | Das et al. |
| 9,131,459 | B2 | 9/2015 | Tenny et al. |
| 9,392,621 | B2 | 7/2016 | Bachu et al. |
| 9,459,337 | B2 | 10/2016 | Aldana et al. |
| 9,699,052 | B2 | 7/2017 | Aldana et al. |
| 9,923,792 | B2 | 3/2018 | Aldana et al. |
| 10,129,120 | B2 | 11/2018 | Aldana et al. |
| 2002/0164963 | A1 | 11/2002 | Tehrani et al. |
| 2003/0123413 | A1 | 7/2003 | Moon et al. |
| 2003/0148761 | A1 | 8/2003 | Gaal |
| 2004/0004934 | A1 | 1/2004 | Zhu et al. |
| 2005/0259824 | A1 | 11/2005 | Isozaki et al. |
| 2008/0291883 | A1 | 11/2008 | Seok |
| 2010/0008314 | A1 | 1/2010 | Maheshwari et al. |
| 2010/0046388 | A1* | 2/2010 | Kim .................. H04L 43/0864 370/252 |
| 2010/0081447 | A1 | 4/2010 | Qi et al. |
| 2010/0157848 | A1 | 6/2010 | Das et al. |
| 2011/0158116 | A1 | 6/2011 | Tenny et al. |
| 2011/0246148 | A1 | 10/2011 | Gupta et al. |
| 2011/0292820 | A1 | 12/2011 | Ekbal et al. |
| 2012/0057872 | A1 | 3/2012 | Freda et al. |
| 2012/0218982 | A1 | 8/2012 | Lee et al. |
| 2012/0257604 | A1* | 10/2012 | Honkanen ............ H04W 4/023 370/338 |
| 2012/0257614 | A1 | 10/2012 | Chin et al. |
| 2012/0269080 | A1 | 10/2012 | Giustiniano et al. |
| 2012/0306691 | A1 | 12/2012 | Werner |
| 2013/0109405 | A1 | 5/2013 | Siomina et al. |
| 2014/0073352 | A1 | 3/2014 | Aldana et al. |
| 2014/0177607 | A1 | 6/2014 | Li et al. |
| 2014/0335885 | A1* | 11/2014 | Steiner .................. H04W 64/00 455/456.1 |

FOREIGN PATENT DOCUMENTS

| | | |
|---|---|---|
| WO | 2010075341 | 7/2010 |
| WO | 2010151830 | 12/2010 |
| WO | 2011094707 A1 | 8/2011 |
| WO | 2011137396 | 11/2011 |
| WO | 2011149496 A1 | 12/2011 |
| WO | 2013062586 A1 | 5/2013 |
| WO | WO2013062586 A1 * | 5/2013 |

OTHER PUBLICATIONS

"Action Frame Format Details, 8.6", IEEE P802.11-REVmc™/D1.5, Jun. 2013. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2013, New York, NY, USA, pp. 943-1076.

Aldana C., et al., "802.11-2012 CID_46_47_48; 11-12-1249-04-000m-802-11-2012-cid-46-47-48", QUALCOMM, IEEE SA Mentor; 11-12-1249-04-000M-802-11-2012-CID-46-47-48, IEEE-SA Mentor, Piscataway, NJ USA, vol. 802.11m, No. 4, Jan. 17, 2013 (Jan. 1, 2013), pp. 1-17, XP068040038.

Aldana C., (QUALCOMM): "CIDs 46,47,48 Regarding Fine Timing Measurement", IEEE P802.11;11-12-1249-04-000m, IEEE-SA Mentor, Jan. 17, 2013, vol. 802.11m, No. 4, pp. 1-17.

International Search Report and Written Opinion—PCT/US2014/040095—ISA/EPO—dated Sep. 15, 2014.

"Timing measurement procedure 10.24.5", IEEE P802.11-REVmc™/D3.0, Jun. 2014. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2014, New York, NY, USA, pp. 1713-1722.

"TM and FTM frames, 8.6.8.31 ", IEEE P802.11-REVmc™/D3.0, Jun. 2014. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2014, New York, NY, USA, pp. 1121-1124.

Table of Contents, IEEE P802.11-REVmc™/D1.5, Jun. 2013. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2013, New York, NY, USA, pp. i-lxii.

"Table of Contents", IEEE P802.11-REVmc™/D3.0, Jun. 2014. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2014, New York, NY, USA, pp. 1-69.

Taiwan Search Report—TW103119093—TIPO—dated Mar. 11, 2016.

"Timing measurement procedure, 10.24.5", IEEE P802.11-REVmc™/D1.5, Jun. 2013. Draft Standard for Information technology—Telecommunications and information exchange between systems Local and metropolitan area networks—Specific Requirements; Part 11: Wireless LAN Medium Access Control (MAC) and Physical Layer (PHY) Specifications, 2013, New York, NY, USA, pp. 1536-1540.

\* cited by examiner

|      | Category | Action | Trigger | Min delta T | Timeout | Frames Per Burst | Burst Period |
|------|----------|--------|---------|-------------|---------|------------------|--------------|
| Bits: | 8 | 8 | 8 | 16 | 8 | 8 | 16 |

FIG. 4A

|      | Category | Action | Trigger | Length | Frames Per Burst | Min delta T | Timeout | Burst Period | Offset |
|------|----------|--------|---------|--------|------------------|-------------|---------|--------------|--------|
| Bits: | 8 | 8 | 8 | 4 | 8 | 8 | 8 | 16 | 8 |

FIG. 4B

|      | Category | Action | Trigger | Min_delta_T_OK | Frames Per Burst | Burst Period OK |
|------|----------|--------|---------|----------------|------------------|-----------------|
| Bits: | 8 | 8 | 8 | 1 | 8 | 1 |

FIG. 5A

| Category | Action | Dialog Token | Follow Up Dialog Token | TOD | TOA |
|---|---|---|---|---|---|
| 8 | 8 | 8 | 8 | 48 | 48 |
| Bits: | | | | | |

| Max TOD Error | Max TOA Error | Trigger | Min_delta_T_OK | Frames per Burst | Burst Period OK |
|---|---|---|---|---|---|
| 16 | 16 | 8 | 1 | 8 | 1 |
| Bits: | | | | | |

FIG. 7A

|  | Category | Action | Trigger | RTT |
|---|---|---|---|---|
| Bits: | 8 | 8 | 8 | 16 |

FIG. 9A

| Bits: | Category | Action | Trigger | Min delta T | Timeout | Frames Per Burst | Burst Period | Offset | Channel | Previous RTT Value |
|---|---|---|---|---|---|---|---|---|---|---|
| | 8 | 8 | 8 | 16 | 8 | 8 | 16 | 8 | 4 | 16 |

FIG. 10B

| Not authorized | Reserved (RTT value valid) | Offset valid | Min delta T valid | Timeout valid | Frames Per Burst valid | Burst Period valid | Enable |
|---|---|---|---|---|---|---|---|
| 1 | 1 | 1 | 1 | 1 | 1 | 1 | 1 |

FIG. 10C

| Reserved | Rejected | Min delta T valid/accept | Timeout Valid/accept | Burst Period Valid/accept | Offset valid/accept | Frames per burst valid/accept | Enable |
|---|---|---|---|---|---|---|---|
| 1 | 1 | 1 | 1 | 1 | 1 | 1 | 1 |

| | Category | Action | Dialog Token | Follow up Dialog Token | TOD | TOA |
|---|---|---|---|---|---|---|
| Bits: | 8 | 8 | 8 | 8 | 48 | 48 |

| | Max TOD Error | Max TOA Error | Trigger | Frames per Burst |
|---|---|---|---|---|
| Bits: | 16 | 16 | 8 | 8 |

FIG. 10F

| | Category | Action | Dialog Token | Follow up Dialog Token | TOD | | | | | TOA | |
|---|---|---|---|---|---|---|---|---|---|---|---|
| | | | | | Trigger | Length | Frames per burst | Min delta T | Burst period | Offset | Remaining |
| Bits: | 8 | 8 | 8 | 8 | 8 | 4 | 8 | 8 | 16 | 8 | 44 |

| | Max TOD Error | Max TOA Error |
|---|---|---|
| Bits: | 16 | 16 |

|  | Category | Action | Dialog Token | Follow up Dialog Token | Trigger | Frames per Burst |
|---|---|---|---|---|---|---|
| Bits: | 8 | 8 | 8 | 8 | 8 | 8 |

FIG. 10G

| Bits: | Category | Action | Trigger | Length | Min delta T | Offset | Burst period | Frames per burst | Timeout |
|---|---|---|---|---|---|---|---|---|---|
| | 8 | 8 | 8 | 4 | 8 | 8 | 16 | 8 | 8 |

FIG. 10J

| | Reserved | Min delta T valid/accept | Offset valid/accept | Burst Period Valid/accept | Frames per burst valid/accept | Timeout Valid/accept | Enable |
|---|---|---|---|---|---|---|---|
| | 1 | 1 | 1 | 1 | 1 | 1 | 1 |

FIG. 10K

| | Category | Action | Dialog Token | Follow up Dialog Token | TOD | | | | | TOA | |
|---|---|---|---|---|---|---|---|---|---|---|---|
| | | | | | Trigger | Length | Min delta T | Offset | Burst period | Frames per burst | Remaining |
| Bits: | 8 | 8 | 8 | 8 | 8 | 4 | 8 | 8 | 16 | 8 | 44 |

| | Max TOD Error | Max TOA Error |
|---|---|---|
| Bits: | 16 | 16 |

FIG. 10L

| | Category | Action | Trigger | Length | Number of bursts | Frames per burst | Burst offset | Burst Period | Burst Timeout | Min delta FTM | FTM1 Timeout | MCS | BW |
|---|---|---|---|---|---|---|---|---|---|---|---|---|---|
| Bits: | 8 | 8 | 8 | 4 | 16 | 8 | 8 | 16 | 16 | 8 | 8 | 6 | 4 |

FIG. 10M

| | Category | Action | Trigger | Dialog Token | FTM Indication Broadcast Data Rate | FTM Indication Parameters |
|---|---|---|---|---|---|---|
| Bits: | 8 | 8 | 8 | 8 | 16 | Variable (<=10 bytes) |

FIG. 10O

| | Category | Action | Trigger | Dialog Token | FTM Indication Broadcast Data Rate | Sub-element ID | Length | Number of bursts | FTMs per burst | Burst offset | Burst Period | Burst Timeout | Min delta FTM | FTM1 Timeout |
|---|---|---|---|---|---|---|---|---|---|---|---|---|---|---|
| Bits: | 8 | 8 | 8 | 8 | 6 | 8 | 4 | 16 | 4 | 8 | 16 | 8 | 4 | 8 |

FIG. 10P

| | Sub-element ID | Length | Number of bursts | FTMs per burst | Burst offset | Burst Period | Burst Timeout | Min delta FTM | FTM1 Timeout |
|---|---|---|---|---|---|---|---|---|---|
| Bits: | 8 | 8 | 16 | 4 | 8 | 16 | 8 | 4 | 8 |

FIG. 10S

| | Category | Action | Trigger | Dialog Token | FTM Indication Parameters | FTM Indication Channels | FTM Status | FTM Indication Broadcast Data Rate |
|---|---|---|---|---|---|---|---|---|
| Bits: | 8 | 8 | 8 | 8 | Variable | Variable | Variable | Variable |

FIG. 10T

| | Category | Action | Trigger | Dialog Token | Follow-Up Dialog Token | FTM Indication Parameters | FTM Indication Channels | FTM Status | FTM Indication Broadcast Data Rate |
|---|---|---|---|---|---|---|---|---|---|
| Bits: | 8 | 8 | 8 | 8 | 8 | Variable | Variable | Variable | Variable |

FIG. 10U

| Subelement ID | Length | Transmit Power | Antenna ID | Antenna Gain | RSNI | RCPI |
|---|---|---|---|---|---|---|
| 1 | 1 | 1 | 1 | 1 | 1 | 1 |

Octets:

FIG. 10V

| | Category | Action | Trigger | FTM Indication Parameters | Willing to share time-stamps |
|---|---|---|---|---|---|
| Bits: | 8 | 8 | 8 | Variable (<=72 bits) | 1 |

FIG. 13

| Element ID | Length | Number of bursts | FTMs per burst | Min delta FTM | Burst Offset | Burst Period | Burst Timeout | FTM Channel Spacing |
|---|---|---|---|---|---|---|---|---|
| Bits: | 4(8) | 4(8) | 4 | 8 | 8 | 16 | 16 | 4 | 8 |

| CHANNEL SPACING (MHz) | 1 | 2 | 4 | 5 | 6 | 7 | 8 | 10 | 12 | 14 | 16 | 20 | 24 | 28 | 32 | 40 | 80 | 160 | 2160 | RESERVED |
|---|---|---|---|---|---|---|---|---|---|---|---|---|---|---|---|---|---|---|---|---|
| CHANNEL SPACING VALUE | 1 | 2 | 3 | 4 | 5 | 6 | 7 | 8 | 9 | 10 | 11 | 12 | 13 | 14 | 15 | 16 | 17 | 18 | 19 | |

FIG. 15B

| CHANNEL SPACING (MHz) | 1 | 2 | 4 | 5 | 6 | 7 | 8 | 10 | 12 | 14 | 16 | 20 non-HT | 20 HT | 20 VHT | 24 | 28 | 32 | 40 HT | 40 VHT | 80 VHT | 80+80 VHT | 160 | 2160 | RESERVED |
|---|---|---|---|---|---|---|---|---|---|---|---|---|---|---|---|---|---|---|---|---|---|---|---|---|
| CHANNEL SPACING VALUE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0,24 - 255 |

| CATEGORY | ACTION | TRIGGER | DIALOG TOKEN | FOLLOW-UP DIALOG TOKEN | FTM INDICATION STATUS | TRANSMIT POWER | ANTENNA GAIN | ANTENNA ID | PRESSURE | FTM INDICATION PARAMETERS |
|---|---|---|---|---|---|---|---|---|---|---|
| 8 | 8 | 8 | 8 | 8 | 8 | 8 | 8 | 8 | 34 | VARIBLE (<=72) |

…

METHODS AND SYSTEMS FOR ENHANCED ROUND TRIP TIME (RTT) EXCHANGE

This patent application is a continuation of and claims priority to patent application Ser. No. 15/625,671, filed Jun. 16, 2017, titled "Methods and Systems for Enhanced Round Trip Time (RTT) Exchange," which is a continuation of and claims priority to patent application Ser. No. 14/285,594, filed May 22, 2014, now granted U.S. Pat. No. 9,699,052, titled "Methods and Systems for Enhanced Round Trip Time (RTT) Exchange," which in turn claims priority to each of U.S. Provisional Patent Application Nos. 61/829,204, filed May 30, 2013, titled "Methods and Systems for Enhanced Round Trip Time (RTT) Exchange," 61/846,523, filed Jul. 15, 2013, titled "Methods and Systems for Enhanced Round Trip Time (RTT) Exchange," 61/859,275, filed Jul. 28, 2013, titled "Methods and Systems for Enhanced Round Trip Time (RTT) Exchange," 61/867,593, filed Aug. 19, 2013, titled "Methods and Systems for Enhanced Round Trip Time (RTT) Exchange," 61/899,796, filed Nov. 4, 2013, titled "Methods and Systems for Enhanced Round Trip Time (RTT) Exchange," and 61/937,435, filed Feb. 7, 2014, titled "Methods and Systems for Enhanced Round Trip Time (RTT) Exchange," which are each, in their entirety, hereby incorporated by reference.

BRIEF DESCRIPTION

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 4A is a diagram showing fields in a fine timing measurement request frame or message according to an embodiment.

FIG. 4B is a diagram showing fields of an example fine timing measurement request message transmitted by a receiving STA according to an alternative embodiment.

FIG. 5A is a diagram showing fields in a fine timing measurement request message acknowledgement frame according to an embodiment.

FIG. 7A is a diagram showing fields in a hybrid fine timing measurement request message acknowledgement frame according to an embodiment.

FIG. 9A a diagram showing fields of a fine timing round trip time (RTT) feedback frame according to an embodiment.

FIG. 10B is a diagram showing fields in a fine timing measurement request frame according to an alternative embodiment.

FIG. 10C is a diagram showing definitions of values in a trigger field in a fine timing measurement request frame according to an embodiment.

FIG. 10D is a diagram showing definitions of values in a trigger field in a fine timing measurement request frame according to an embodiment.

FIGS. 10E, 10F and 10G are diagrams showing fields in a hybrid fine timing measurement acknowledgement frame according to an alternative embodiment.

FIG. 10J is a diagram illustrating fields of a fine timing measurement request message according to an alternative embodiment.

FIG. 10K is a diagram showing definitions of a trigger field according to an alternative embodiment.

FIG. 10L is a diagram showing fields of a hybrid fine timing measurement request message acknowledgement frame according to an embodiment.

FIG. 10M is a diagram illustrating fields of a fine timing measurement request message according to an embodiment.

FIG. 10O is a diagram illustrating fields of a fine timing measurement request message according to an embodiment.

FIG. 10P is a diagram illustrating fields of a fine timing measurement request message according to an embodiment.

FIG. 10S is a diagram illustrating fields that make up FTM parameters in a fine timing measurement request message according to an embodiment.

FIG. 10T is a diagram illustrating fields that make up a fine timing measurement response frame according to an embodiment.

FIG. 10U is a diagram illustrating fields that make up a fine timing measurement response frame according to an alternative embodiment.

FIG. 10V is a diagram illustrating at least a subset of fields that make up a fine timing measurement message according to an embodiment.

FIG. 13 shows fields of a fine timing measurement request message including a field to specify a willingness to share timestamps according to an embodiment.

FIG. 14 shows fields of fine timing measurement request message including one field to specify fine timing measurement channel spacing according an embodiment.

FIGS. 15A and 15B show implementations of encoding a value for fine timing measurement channel spacing according an embodiment.

SUMMARY

Figure 1:
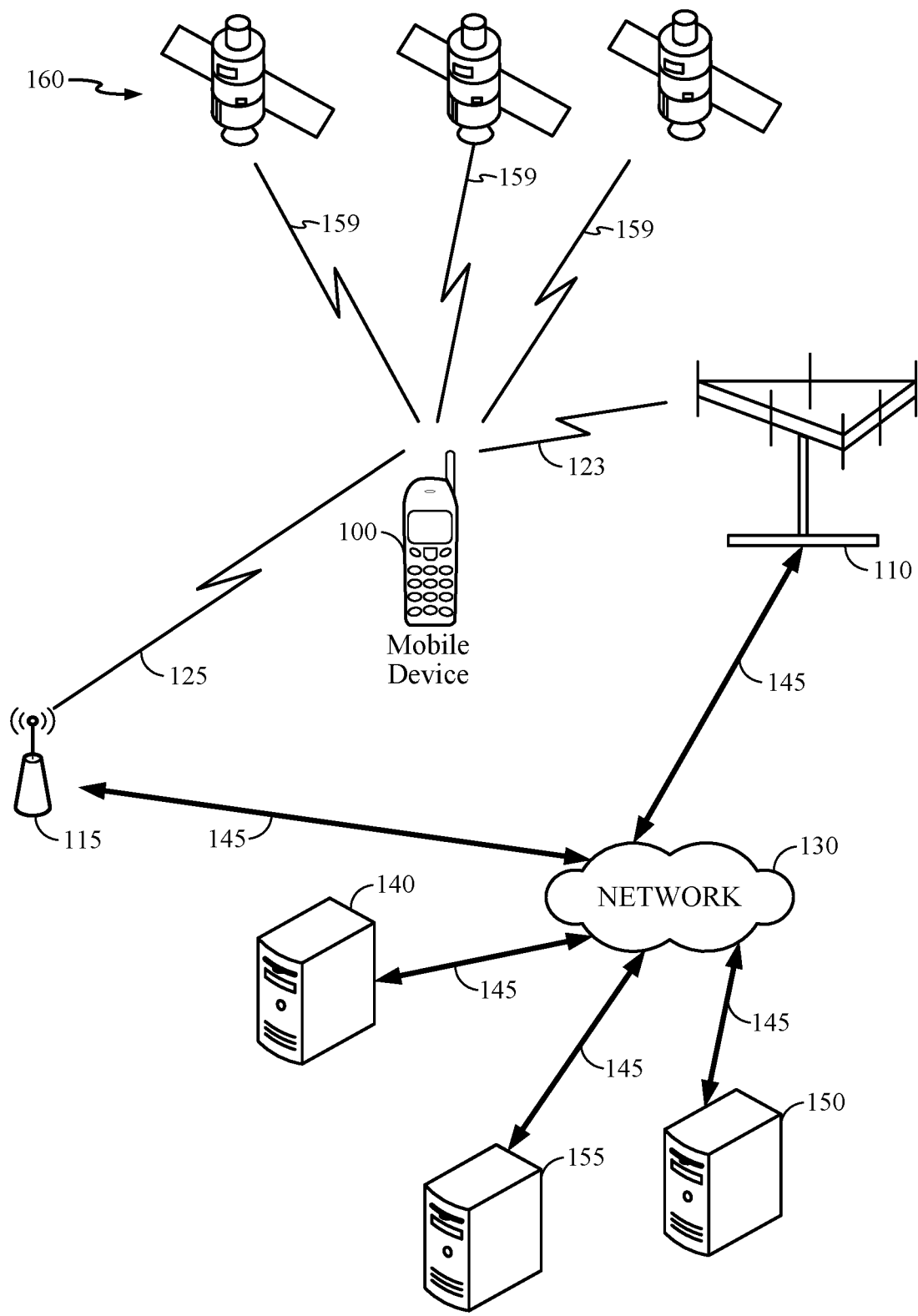
FIG. 1 is a system diagram illustrating certain features of a system containing a mobile device, in accordance with an implementation.

Briefly, particular implementations are directed to a method comprising, at a first wireless transceiver device: transmitting a fine timing measurement request message to a second wireless transceiver device, the fine timing measurement request message comprising at least one field specifying at least one physical signal characteristic of one or more fine timing measurement messages requested for transmission from the second wireless transceiver device in response to the fine timing measurement request message.

Another particular implementation is directed to a first wireless transceiver device comprising: a transceiver to transmit messages to and receive messages from a wireless communication network; and one or more processors capable of executing instructions to initiate transmission of a fine timing measurement request message through the transceiver to a second wireless transceiver device, the fine timing measurement request message comprising at least one field specifying at least one physical signal characteristic of one or more fine timing measurement messages requested for transmission from the second wireless transceiver device in response to the fine timing measurement request message.

Another particular implementation is directed to an article comprising: a non-transitory storage medium comprising machine-readable instructions stored thereon which are executable by a special purpose computing apparatus of a first wireless transceiver device to: initiate transmission of a fine timing measurement request message to a second wireless transceiver device, the fine timing measurement request message comprising at least one field specifying at least one physical signal characteristic of one or more fine timing measurement messages requested for transmission from the second wireless transceiver device in response to the fine timing measurement request message.

Another particular implementation is directed to a first wireless transceiver device comprising: means for transmitting a fine timing measurement request message to a second wireless transceiver device, the fine timing measurement request message comprising at least one field specifying at least one physical signal characteristic of one or more fine timing measurement messages requested for transmission from the second wireless transceiver device in response to the fine timing measurement request message; and means for receiving from the second transceiver device one or more fine timing measurement request frames transmitted based, at least in part, on the at least one field.

Another particular implementation is directed to a method comprising, at a first wireless transceiver device: receiving a fine timing measurement request message from a second wireless transceiver device, the fine timing measurement request message comprising at least one field specifying at least one physical signal characteristic of one or more fine timing measurement messages requested for transmission from the second wireless transceiver device in response to the fine timing measurement request message; and in response to receipt of the fine timing measurement request message, transmitting one or more bursts of fine timing measurement messages to the second wireless transceiver device based, at least in part, on the at least one field.

Another particular implementation is directed to a first wireless transceiver device, comprising: a transceiver to transmit messages to and receive messages from a wireless communication network; and one or more processors to: obtain a fine timing measurement request message received at the transceiver from a second wireless transceiver device, the fine timing measurement request message comprising at least one field specifying at least one physical signal characteristic of one or more fine timing measurement messages requested for transmission from the second wireless transceiver device in response to the fine timing measurement request message; and in response to receipt of the fine timing request measurement message, initiate transmission of one or more bursts of fine timing measurement messages through the transceiver to the second wireless transceiver device based, at least in part, on the at least one field.

Another particular implementation is directed to an article comprising: a non-transitory storage medium comprising machine-readable instructions stored thereon which are executable by a special purpose computing apparatus of a first wireless transceiver device to: obtain a fine timing measurement request message received from a second wireless transceiver device, the fine timing measurement request message comprising at least one field specifying at least one physical signal characteristic of one or more fine timing measurement messages requested for transmission from the first wireless transceiver device in response to the fine timing measurement request message; and in response to the fine timing request measurement message, initiate transmission of one or more bursts of fine timing measurement messages to the second wireless transceiver device based, at least in part, on the at least one field.

Another particular implementation is directed to a first wireless transceiver device comprising: means for receiving a fine timing measurement request message from a second wireless transceiver device, the fine timing measurement request message comprising at least one field specifying at least one physical signal characteristic of one or more fine timing measurement messages requested for transmission from the second wireless transceiver device in response to the fine timing measurement request message; and means for transmitting one or more bursts of fine timing measurement messages to the second wireless transceiver device in response to receipt of the fine timing request measurement message based, at least in part, on the at least one field.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining RTT measurements with sufficient accuracy for measuring a range between the wireless STAs using fewer messages, for example. Such a measured range may be used in any one of several applications including positioning operations, for example.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123. Similarly, mobile device 100 may transmit wireless signals to, or receive wireless signals from local transceiver 115 over wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 110. In another implementation, network 130 may comprise cellular communication network infrastructure such as, for example, a base station controller or master switching center (not shown) to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver, between two peer mobile devices, or between two stationary transceivers, just to provide a few examples. In particular implementations, various techniques described herein may incorporate some, but not necessarily all, aspects or features of IEEE Standard 802.11 for Information technology—Telecommunications and information exchange between systems, Local and metropolitan area networks—Specific requirements Part 11: Wireless LAN Medium Access Control (MAC) and Physical Layer (PHY), Feb. 6, 2012, section 10.23.5 (hereinafter "IEEE std. 802.11"). Indeed, it should be understood that some features described herein are not shown, described or taught in the IEEE std. 802.11.

Figure 2:
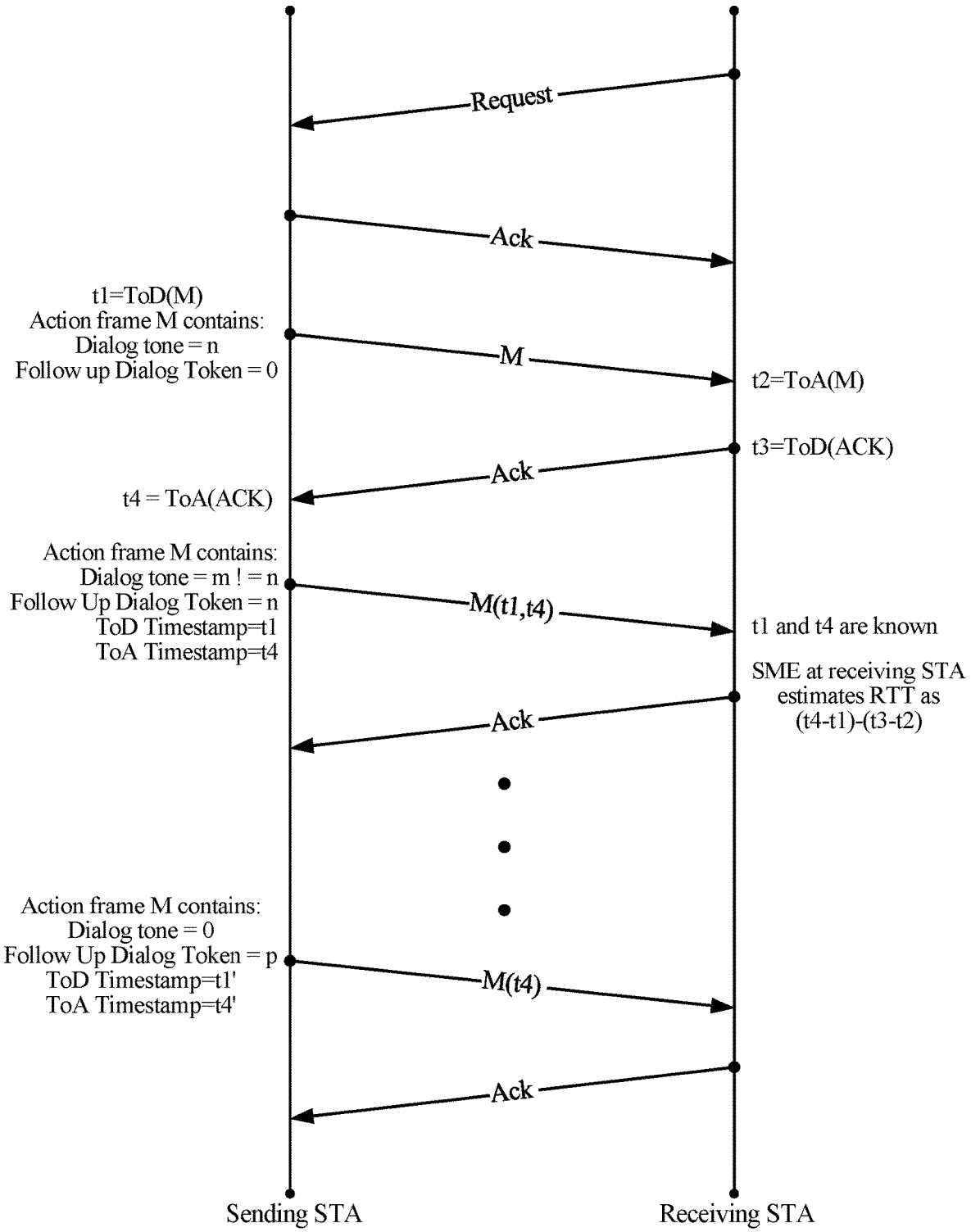
FIG. 2 a diagram illustrating a message flow between wireless stations (STAs) according to an embodiment.

FIG. 2 is a diagram illustrating a message flow between wireless stations STAs including a "sending" STA and a "receiving" STA according to an embodiment. In this context, a sending STA or receiving STA may comprise any one of several transceiver devices including a mobile device (e.g., mobile device 100) or stationary access transceiver device (e.g., local transceiver 115). A receiving STA may obtain or compute one or more measurements of RTT based, at least in part, on timing of messages or frames transmitted between the receiving STA and a sending STA. As used herein, the terms "message" and "frame" are used interchangeably. The receiving STA may transmit a fine timing measurement request message or frame ("Request") to the sending STA and receive a fine timing request message acknowledgement message or frame ("Ack") transmitted in response. In a particular implementation, while not limiting claimed subject matter in this respect, contents of such a fine timing measurement request message may be as shown in the IEEE std. 802.11 at section 8.6.8.25. In particular implementations, such an Ack frame may merely provide an indication of receipt of a previously transmitted message. The receiving STA may then obtain or compute an RTT measurement based, at least in part, on time stamp values (t1, t4) provided in fine timing measurement messages or frames ("M") received from the sending STA (and transmitted in response to receipt of a fine timing measurement request message). In a particular implementation, as shown in the message flow diagram, a sequence of multiple exchanges of alternating fine timing measurement messages followed by fine timing measurement acknowledgement messages may create additional time stamp values (t1, t2, t3 and t4).

In a particular implementation, while not limiting claimed subject matter in this respect, contents of such a fine timing measurement message or frame may be as shown in the IEEE std. 802.11 at section 8.6.8.26. In one example implementation, a receiving STA may compute an RTT measurement as (t4−t1)−(t3−t2), where t2 and t3 are the time of receipt of a previous fine timing measurement message or frame and transmission of a preceding acknowledgement message or frame, respectively. The receiving STA may transmit a series of fine timing measurement request messages in a burst to obtain a corresponding number of RTT measurements which may be combined for removal of measurement noise in computing a range between the receiving and sending STAs.

Figure 3:
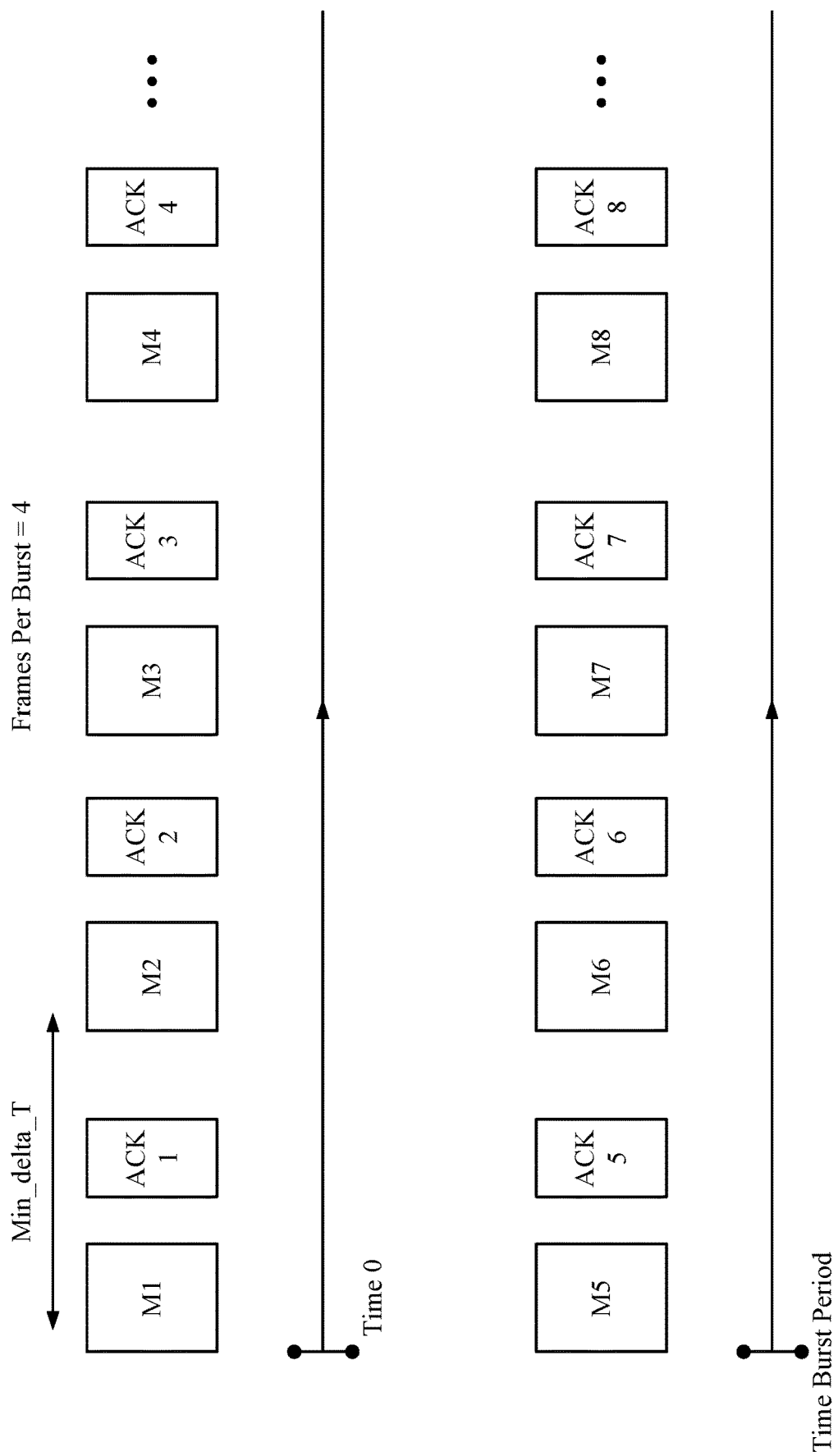
FIG. 3 is a diagram illustrating at least one aspect of timing in connection with message bursts in a message flow between wireless STAs according to an embodiment.

FIG. 3 is a diagram illustrating at least one aspect of timing in connection with message bursts in a message flow between wireless STAs according to an embodiment. As shown, multiple frame pairs of a fine timing measurement messages or frames and corresponding acknowledgement message or frame may be transmitted in a burst (e.g., in response to a single fine timing measurement request message transmitted by a receiving STA and received at a sending STA). In one aspect, a parameter Min_delta_FTM may specify a minimum time between starts of consecutive frame pairs ("fine timing measurement frame pairs") where a start of a frame pair may be marked by transmission of corresponding fine timing measurement message of the pair from a sending STA. In another aspect, a number of frame pairs per burst may be defined by a parameter "Frames per Burst." Here, a frame pair in a burst may comprise a fine timing measurement message transmitted by a sending STA followed by an acknowledgement message transmitted by a receiving STA in response to receipt of the fine timing measurement message.

FIG. 4A shows fields of an example fine timing measurement request message transmitted by a receiving STA according to an embodiment. In addition to fields Category, Action and Trigger as set forth in IEEE std. 802.11, fields Min_delta_FTM, Timeout, Frames per Burst and/or Burst Period may be defined. Here, a value of two for the Trigger field may indicate that the receiving STA may send an RTT measurement back to the sending STA (e.g., following transmission of one or more fine timing measurement messages to the receiving STA). Here, the receiving STA may compute RTT based on techniques described above in connection with FIG. 2. The sending STA may now benefit from of the RTT measurement (or range based on RTT measurement) obtained and computed at the receiving STA. A value of four for the Trigger field may indicate that the receiving STA may accommodate Short Inter-Frame Space (SIFS) bursting techniques. A value for field Min_delta_FTM may indicate a minimum time (e.g., in units of µs) between consecutive fine timing measurement messages or frames as pointed out above. Field Timeout may indicate a length of time (e.g., in units of µs) from transmission of an initial fine timing measurement request frame from a receiving STA until the receiving STA receives a first fine timing measurement frame in response to the initial fine timing measurement request frame.

As pointed out above, a field Frames Per Burst may indicate how many frame pairs are to be transmitted in a given burst. A field Burst Period may indicate how often a burst of measurements are to occur (e.g., in units of 100 ms or target beacon transmission time (TBTT)) where a small value may be applicable to indicate an environment of frequent relative movement between sending and receiving STAs while a large value may be applicable to a relatively stationary environment.

FIG. 4B shows fields of an example fine timing request message transmitted by a receiving STA according to an alternative embodiment. Here, an eight-bit "Frames per Burst" may be replaced with an "Offset" field that may be used to specify a time offset or duration of time that a timing measurement exchange is to begin following transmission of the fine timing measurement request message. In a particular implementation, sixteen-bit field "Burst Period" may specify how often a burst measurements is to occur. In a particular embodiment, a value for "Burst Period" may be expressed in either 100 ms or TBTTs. A small value may be applicable to a relatively dynamic environment while a larger value may be applicable to a relatively static environment. In one example, a value of $2^{16}-1$ in the "Burst Period" field may specify that a single burst is to occur and a value of zero in the "Burst Period" field may specify that an indefinite or infinite number of bursts are to occur.

FIG. 5A is a diagram showing fields in a fine timing measurement request message acknowledgement frame to be transmitted in response to a fine timing measurement request message or frame, such as an implementation of a fine timing measurement request message or frame shown in FIG. 4A according to an embodiment. In a particular example implementation, values for the field Trigger in the timing measurement request message acknowledgement frame of FIG. 5A may indicate an acceptance, rejection or modification of a request set forth in a Trigger field of a corresponding fine timing measurement request. Here, in a particular implementation, the field Trigger in the timing measurement acknowledgement frame of FIG. 5A may indicate the following:

0: Initial Reject
1: OK (default behavior)
3: OK+Send RTT
5: OK+SIFS Bursting
7: OK+Send RTT+SIFS Bursting Similarly, values for the field Min_delta_FTM OK of the timing measurement acknowledgement frame of FIG. 5A may indicate an acceptance, rejection or modification of a parameter set forth in a Min_delta_FTM field of a corresponding fine timing measurement request message or frame. Here, in a particular implementation, the Min_delta_FTM OK field of a fine timing measurement acknowledgement frame may indicate the following:

1: Min_delta_FTM indicated in a request message is acceptable
0: invitation to select a larger Min_delta_FTM Values for field Frames Per Burst of the fine timing measurement request message acknowledgement frame of FIG. 5A may indicate a number of frames a sending STA is capable of sending in a given burst. Values for the field Burst_Period OK of the timing measurement acknowledgement frame of FIG. 5A may indicate an acceptance, rejection or modification of a parameter Burst Period set forth in a corresponding fine timing measurement request frame. Values for Burst_Period OK may indicate the following:

1: Burst_Period is acceptable
0: Invitation to select a larger Burst_Period

In the particular implementation described in connection with FIGS. 4A and 5A, values or parameters shown in FIG. 5A may be transmitted from a sending STA to a receiving STA in a fine timing measurement request message acknowledgement frame. The receiving STA may then apply one or more of the values or parameters shown in FIG. 5A in estimating RTT. In an alternative implementation, values or parameters shown in FIG. 5A may be transmitted from a sending STA to a receiving STA as part of a subsequent fine timing measurement message (e.g., including measured values for t1 or t4). The receiving STA may then apply such values or parameters received in the subsequent fine timing measurement message in computing a measurement of RTT as described above.

Figure 5B:
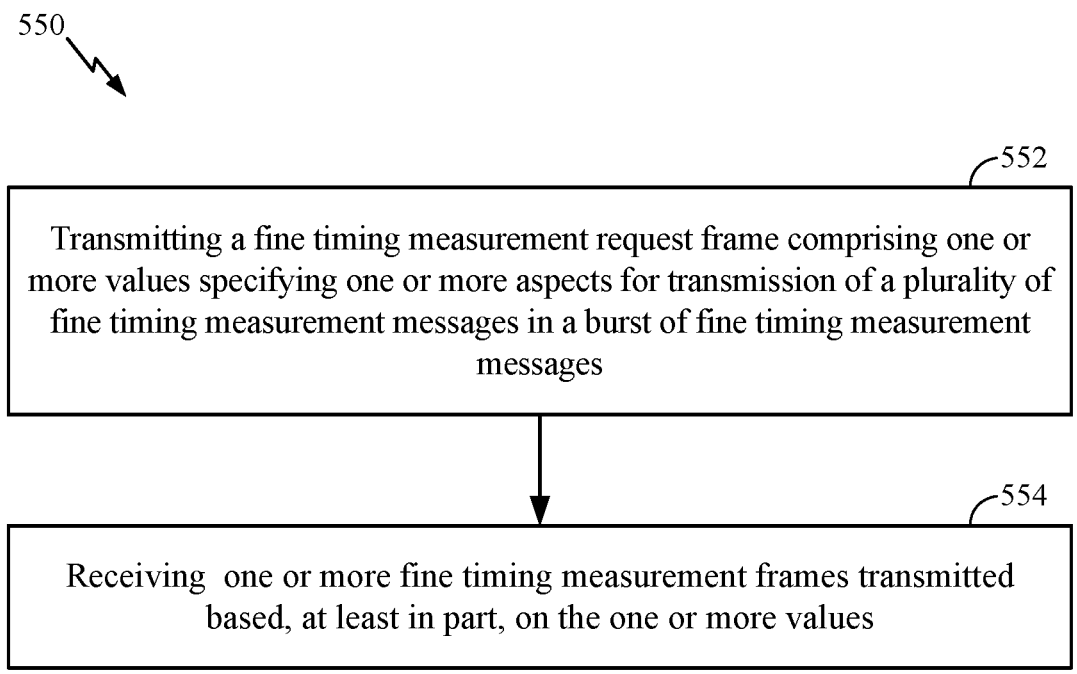
FIGS. 5B through 5E are flow diagrams of processes for exchanging fine timing measurement request frames and fine timing measurement frames by wireless STAs according to an embodiment.

As discussed below in particular exemplary embodiments, a fine timing measurement request message transmitted from a receiving STA to a sending STA may specify one or more aspects of how the receiving STA would desire transmission of fine timing measurement messages to the receiving STA in response to the fine timing measurement request message. For example as shown in FIG. 5B, at block 552 a receiving STA may transmit a fine timing measurement request message to a sending STA. The transmitted fine timing measurement request message may comprise at least one field specifying one or more aspects for transmission of a plurality of fine timing measurement messages in a burst of fine timing measurement messages to be transmitted from a sending STA in response to receipt of the fine timing measurement request message. As discussed below in connection with particular implementations, such aspects for transmission of a plurality of fine timing measurement messages in a burst may comprise, for example, number of fine timing measurements to be transmitted in a burst (e.g., "Frames per Burst"), a maximum allowable time between transmission of a fine timing measurement request message at the receiving STA and receipt of a responsive fine timing measurement request message acknowledgement frame (e.g., "Timeout"), minimum time between consecutive fine timing measurement messages or frames (e.g., "Min_delta_T"), duration of burst (e.g., "Burst Period") or a duration of time between receipt of a fine timing measurement request message at a sending STA and transmission from the sending STA of an initial fine timing measurement message (e.g., "Offset"). It should be understood, however, that these are merely examples of aspects for transmission of a plurality of fine timing measurement messages in a burst, and claimed subject matter is not limit in this respect.

Figure 5C:
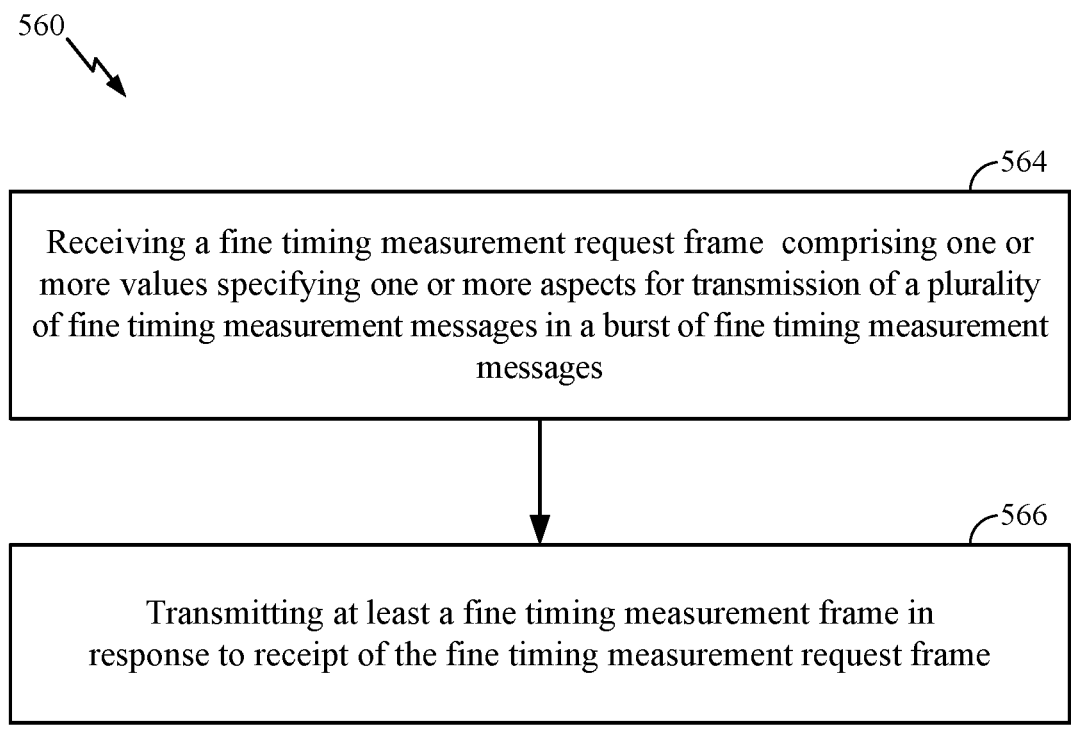

According to an embodiment, a fine timing measurement request message transmitted at block 552 may be received at a sending STA as shown in block 564 of FIG. 5C. The sending STA may then transmit one or more fine timing measurement frames to the receiving STA at block 566 in response to receipt of the fine timing measurement request message. A fine timing measurement frame transmitted at block 566 may then be received by the receiving STA at block 554. Here, one or more fine timing measurement message received at block 554 may have been transmitted at block 566 based, at least in part, on one or more values in a fine timing measurement request message transmitted at block 552.

Figure 5D:
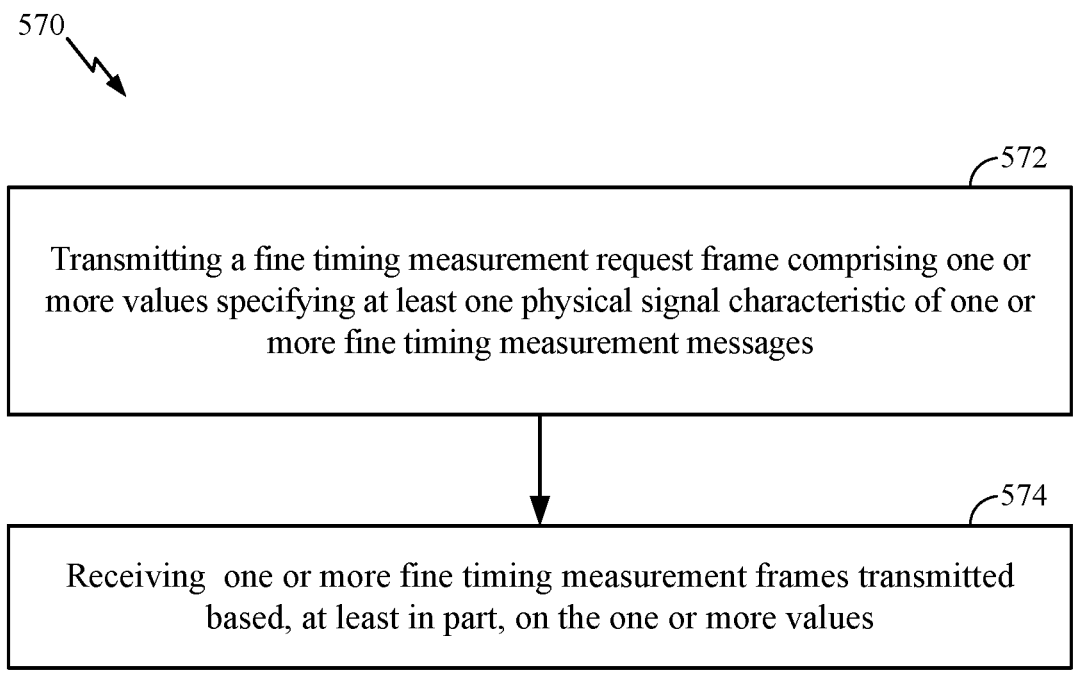
Figure 5E:
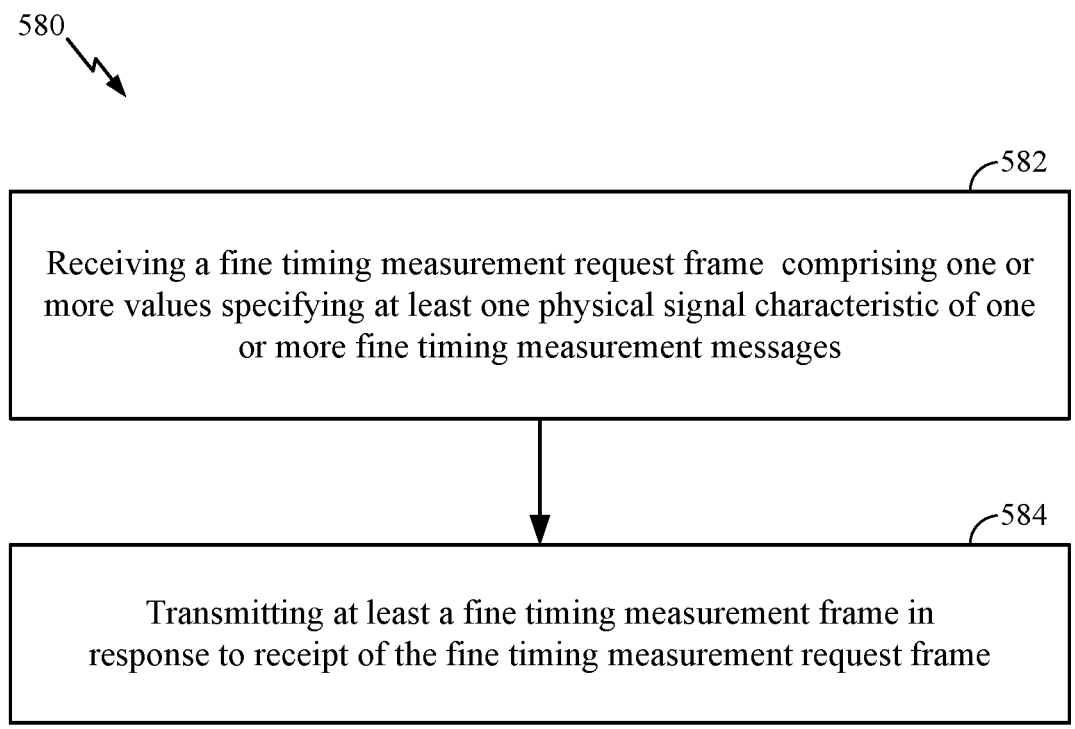

Also as discussed below in particular exemplary embodiments, a fine timing measurement request message transmitted from a receiving STA to a sending STA may specify at least one physical signal characteristic of fine timing measurement messages to be transmitted in response to the fine timing measurement request message. Such physical signal characteristics may include, for example, particular frequency channels, signal encoding, transmission power levels, signal polarity, signal phase, channel separation (or channel spacing), just to provide a few examples. At block 572 of FIG. 5D, for example, a receiving STA may transmit a fine timing measurement request frame comprising at least one field specifying at least one physical signal characteristic of one or more fine timing measurement messages to be transmitted by a sending STA in response to the fine timing measurement request message. The fine timing measurement request frame transmitted at block 572 ay then be received at a sending STA at block 582 of FIG. 5E and processed accordingly. In response to receipt of the fine timing measurement request message received by the sending STA at block 582, the sending STA may transmit one or more fine timing measurement frames for receipt by the receiving STA at block 574.

Figure 6A:
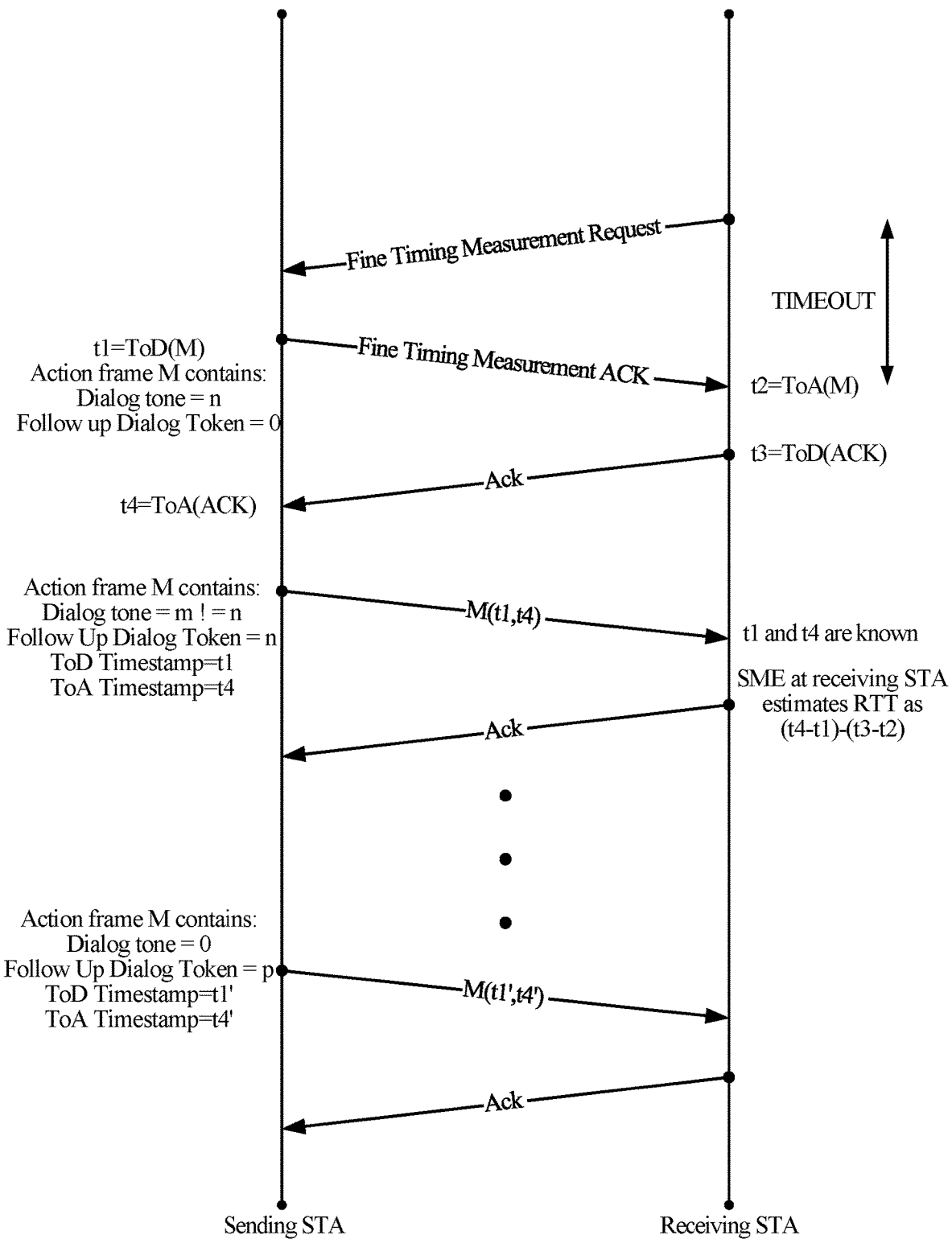
FIG. 6A a diagram illustrating a message flow between wireless STAs according to another alternative embodiment.

FIG. 6A is a diagram illustrating a message flow between wireless STAs according to another alternative embodiment in which a receiving STA transmits a fine timing measurement request message. A sending STA transmits a fine timing measurement request message acknowledgement frame ("Fine Timing Measurement ACK") in response to the fine timing measurement request message incorporating one or more aspects of the fine timing measurement request message shown in FIG. 4A. A value of field Timeout is shown as a maximum allowable time between transmission of a fine timing measurement request message at the receiving STA and receipt of a responsive fine timing measurement request message acknowledgement frame at the receiving STA.

Figure 6B:
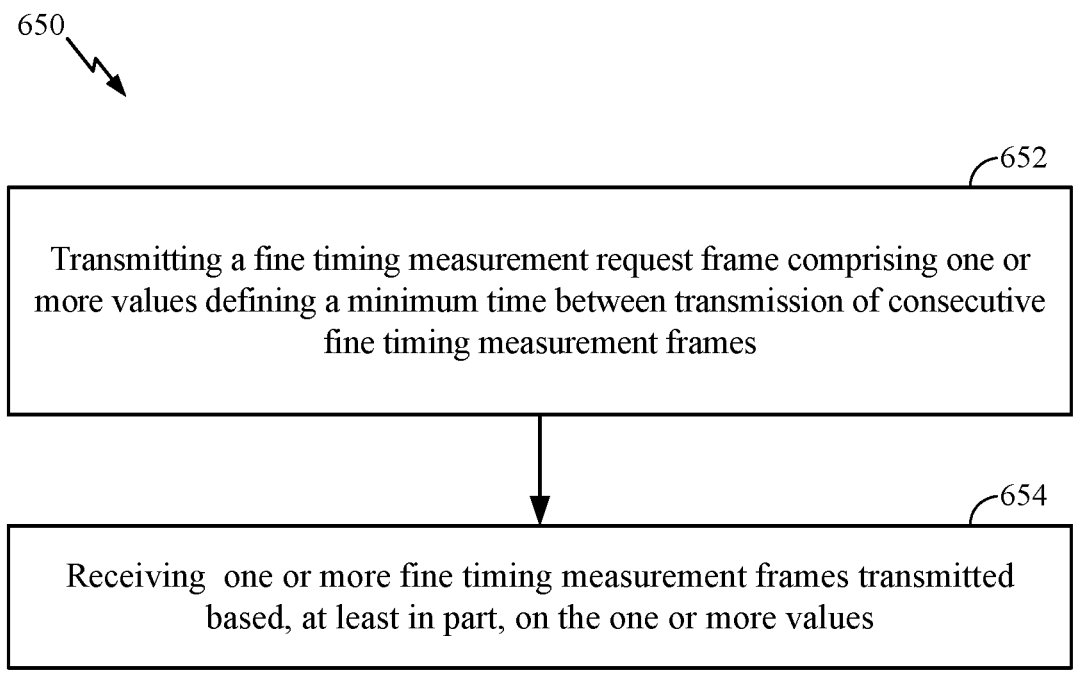
FIGS. 6B and 6C are flow diagrams of processes for exchanging fine timing measurement request frames and fine timing measurement frames by wireless STAs according to an embodiment.
Figure 6C:
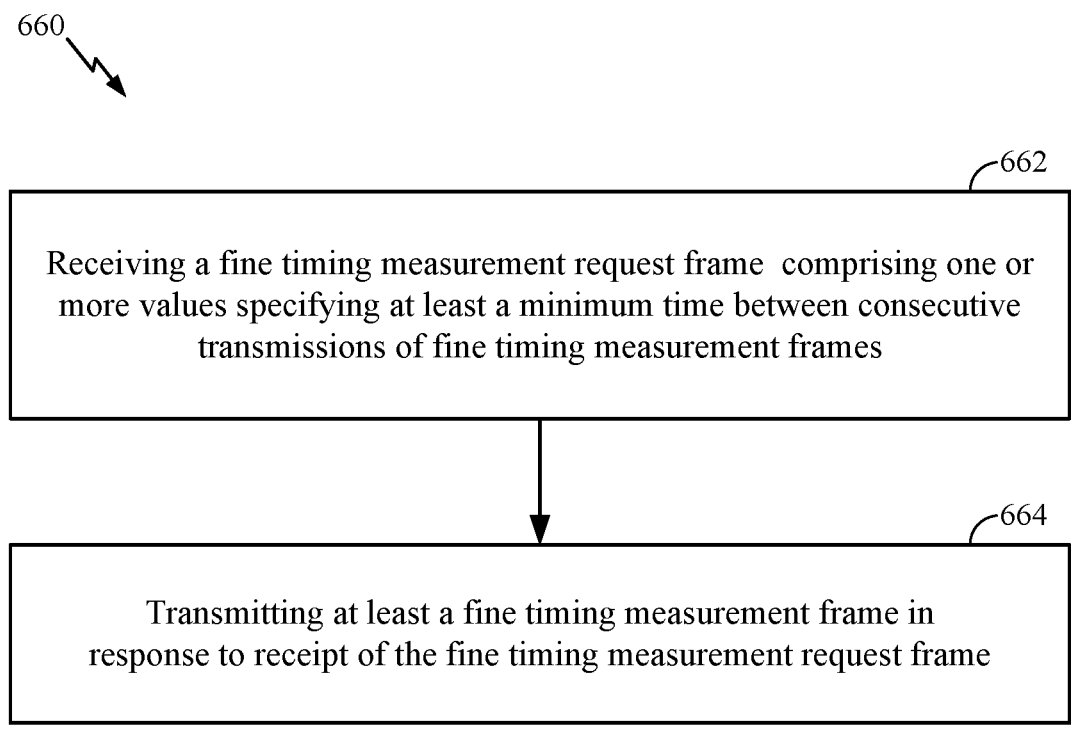

FIGS. 6B and 6C set out actions that may be taken by a receiving STA and a sending STA, respectively, according to an implementation of the message flow shown in FIG. 6A. At block 652, a receiving STA may wirelessly transmit a fine timing measurement request message or frame to a sending STA. The fine timing measurement request message or frame may comprise one or more values defining a minimum time between consecutive fine timing measurement frames to be transmitted by the sending STA in response. This may be specified, for example, by a value in field Min_delta_FTM as set forth in FIG. 4A. In other implementations, the fine timing measurement request frame or message may specify one or more of values for Trigger, Timeout, Field Frames Per Burst, just to provide a few examples. In response to the fine timing measurement request message or frame transmitted at block 652, at block 654 the receiving STA may wirelessly receive one or more fine timing measurement messages or frames transmitted based, at least in part, on the one or more values defining a minimum time between consecutive fine timing measurement frames from a sending STA. The receiving STA may then compute an RTT measurement based, at least in part, on the received fine timing measurement frames.

At block 662, a sending STA may receive a fine timing measurement request frame transmitted by a receiving STA at block 652 and, in response, transmit a fine timing measurement frame to the receiving STA at block 664. As pointed out above in a particular example, the fine timing measurement request frame may comprise one or more values specifying at least a minimum time between consecutive transmissions of fine timing measurement messages. In one example, the fine timing measurement frame transmitted at block 664 may be transmitted based, at least in part, on parameters specified in the received fine timing measurement request frame. In an alternative implementation, measurements may be combined with values or parameters shown in FIG. 5 and transmitted by a sending STA in a fine timing measurement request message acknowledgement frame.

Figure 6D:
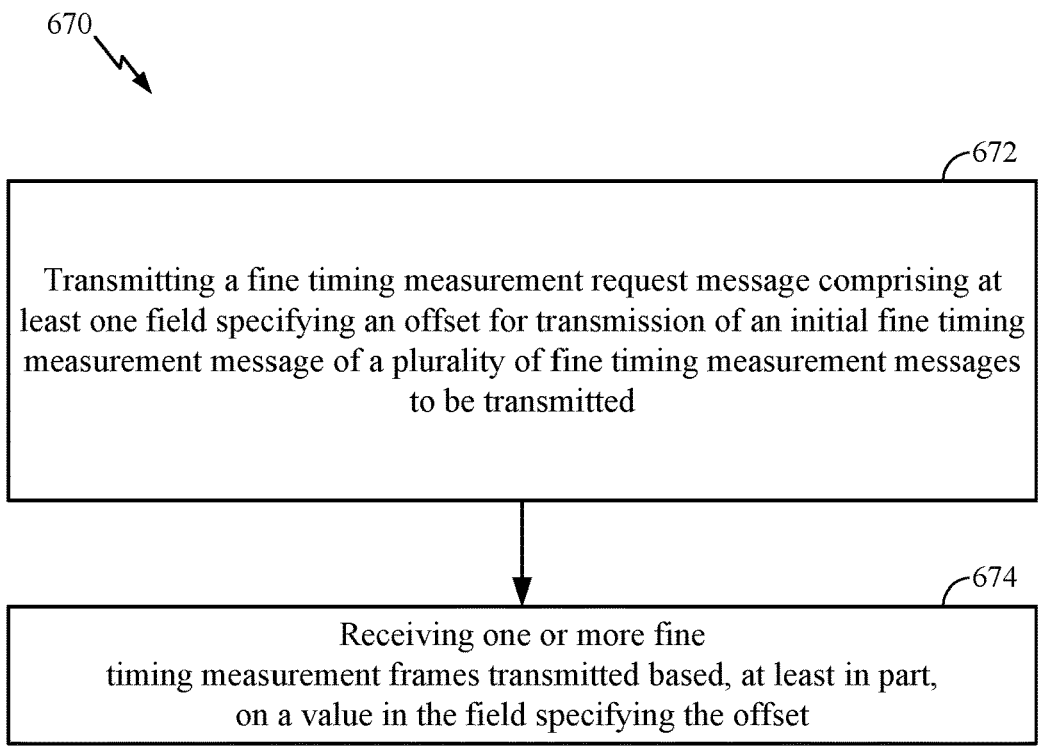
FIGS. 6D and 6E are flow diagrams of processes for exchanging fine timing measurement request frames and fine timing measurement frames by wireless STAs according to an embodiment.
Figure 6E:
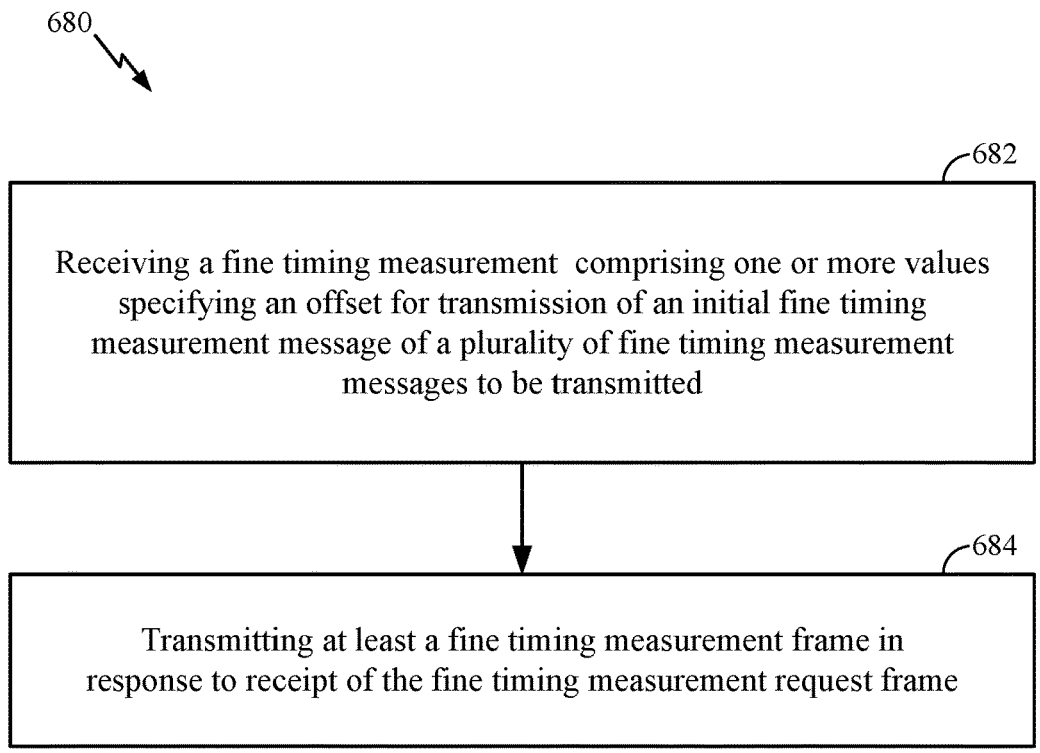

FIGS. 6D and 6E set out actions that may be taken by a receiving STA and a sending STA, respectively, according to an implementation of fields of the fine timing measurement request message shown in FIG. 4B. At block 672, a receiving STA may transmit a fine timing measurement request message to a sending STA comprising at least one field specifying a time offset, such as the Offset field shown in FIG. 4B. The specified time offset may specify a duration of time between receipt of a fine timing measurement request message at a sending STA and transmission from the sending STA of an initial fine timing measurement message (of a plurality of fine timing measurements in a burst) from the sending STA in response to receipt of the fine timing measurement request message. At block 674, the receiving STA may receive from the sending STA one or more fine timing measurement messages based, at least in part, on a value in the field specifying the time offset.

At block 682, a sending STA may receive a fine timing measurement request message from a receiving STA such as a fine timing measurement request message transmitted at block 672 (e.g., comprising at least one field specifying a time offset for transmission of an initial fine timing measurement message of a plurality of fine timing measurement messages to be transmitted). At block 684, the sending STA may transmit to the receiving STA at least a fine timing measurement frame in response to the fine timing measurement request frame.

Figure 6F:
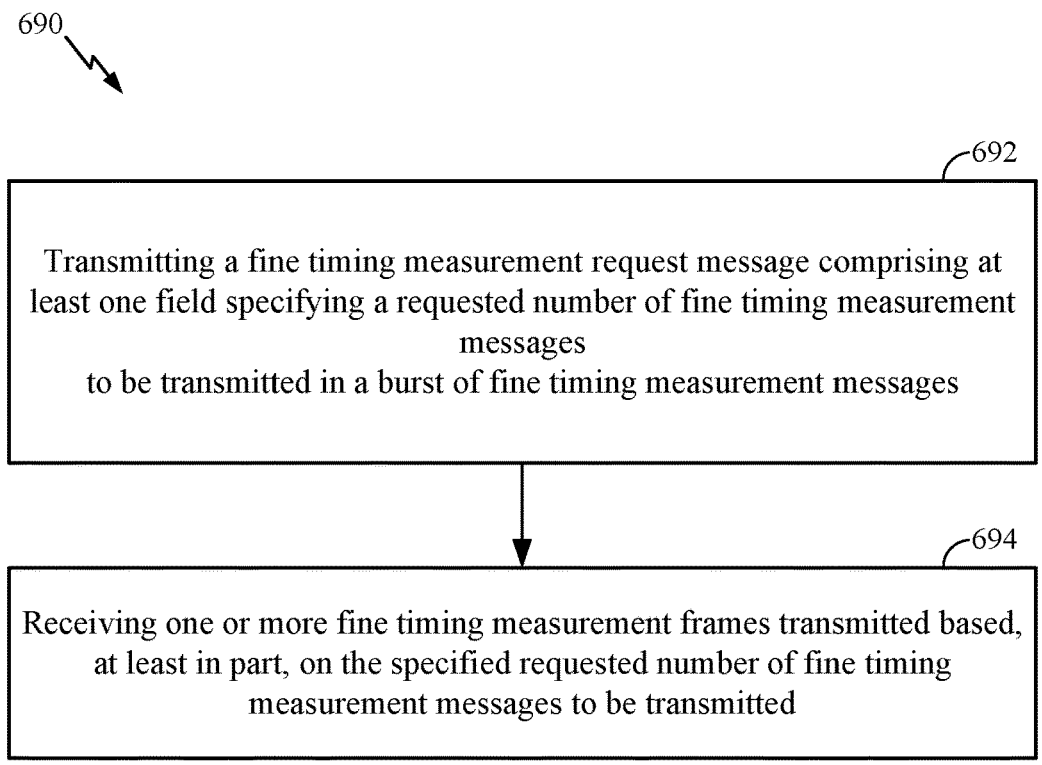
FIGS. 6F and 6G are flow diagrams of processes for exchanging fine timing measurement request frames and fine timing measurement frames by wireless STAs according to an embodiment.
Figure 6G:
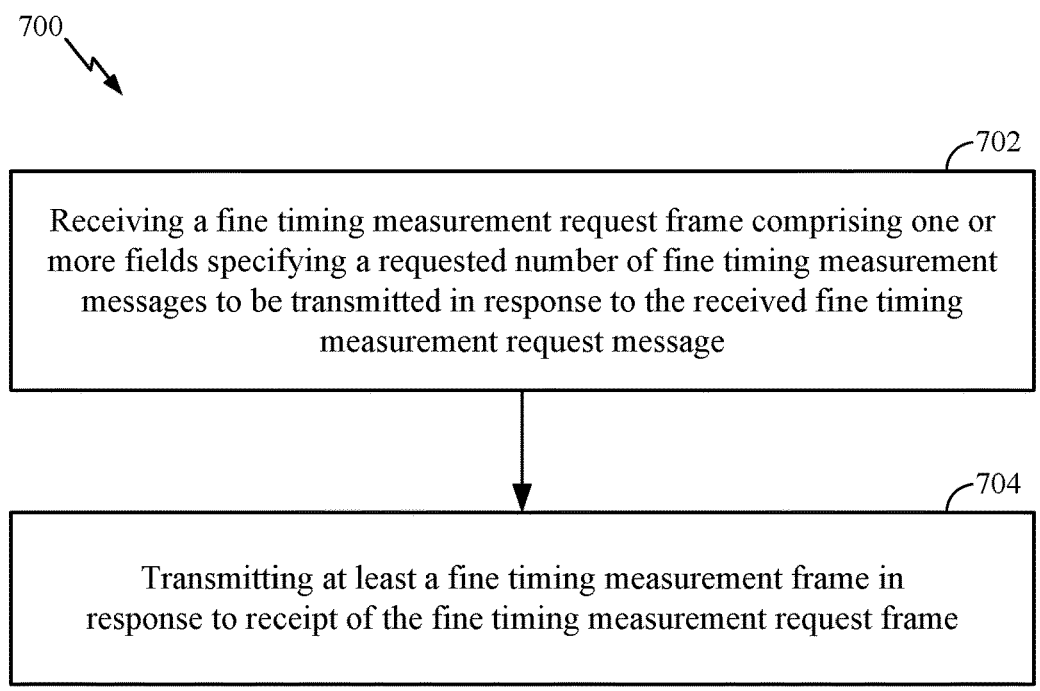

FIGS. 6F and 6G set out actions that may be taken by a receiving STA and a sending STA, respectively, according to an implementation of fields of the fine timing measurement request message shown in FIGS. 4A and 4B. At block 692, a receiving STA may transmit a fine timing measurement request message to a sending STA comprising at least one field specifying a requested number of fine timing measurement messages to be transmitted in a burst of fine timing measurement messages (e.g., "Frames per Burst" in FIGS. 4A and 4B) in response to the fine timing measurement request message. At block 694, the receiving STA may receive from the sending STA one or more fine timing measurement messages based, at least in part, on a value in the field specifying the requested number of fine timing measurements to be transmitted in the burst.

At block 702, a sending STA may receive a fine timing measurement request message such as the fine timing measurement request message transmitted by a receiving STA at block 692 (e.g., including one or more fields specifying a requested number of fine timing measurement messages to be transmitted in a response to the fine timing measurement request message). At block 704, the sending STA may transmit at least a fine timing measurement frame to the receiving STA based, at least in part, on a value in the received fine timing measurement request message specifying the requested number of fine timing measurements to be transmitted in a burst of fine timing measurement messages.

Figure 6H:
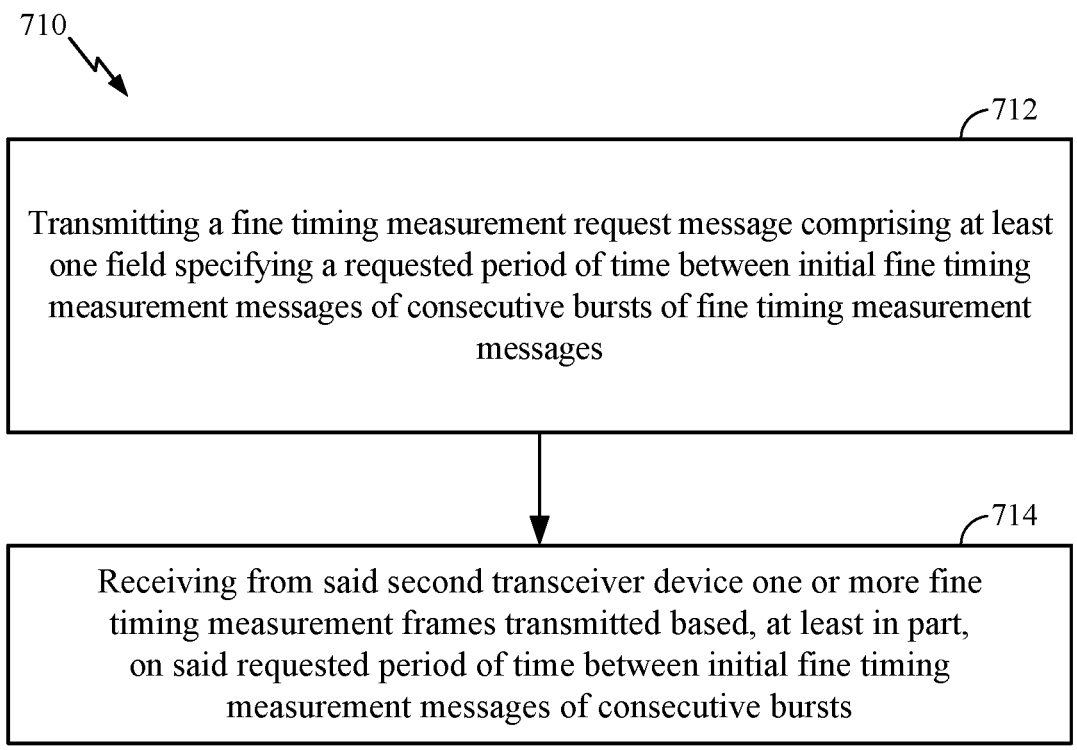
FIGS. 6H and 6I are flow diagrams of processes for exchanging fine timing measurement request frames and fine timing measurement frames by wireless STAs according to an embodiment.
Figure 6I:
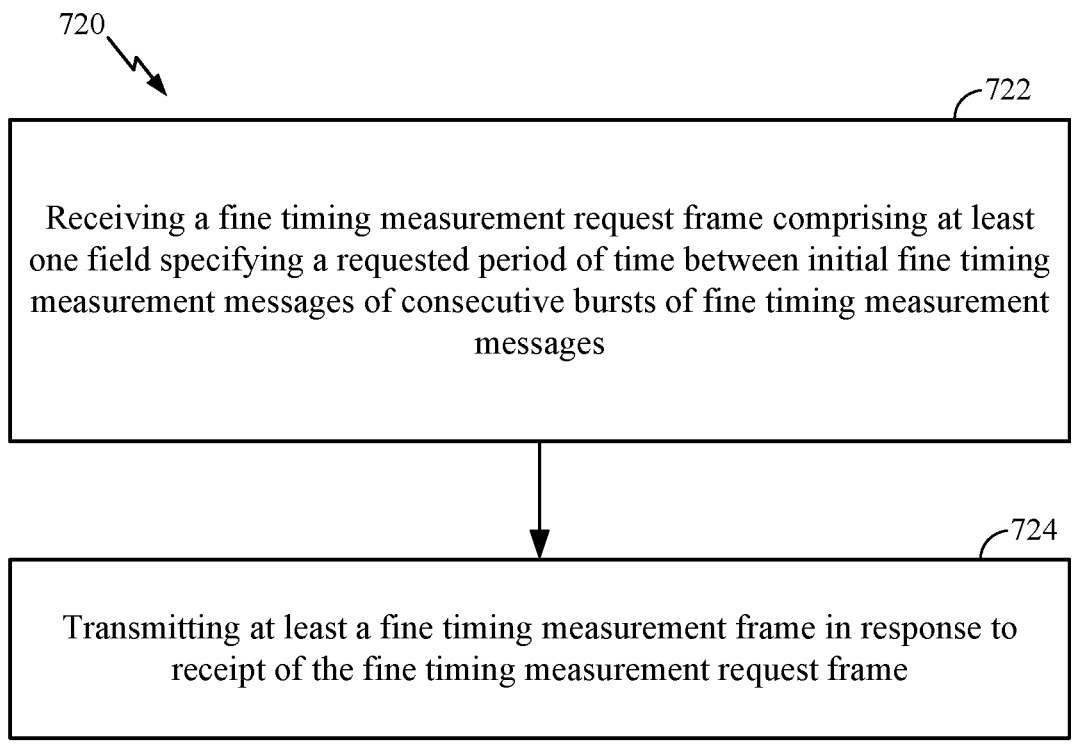

In a particular implementation, a sending STA may provide multiple bursts of fine timing measurements to a receiving STA in response to a single fine timing measurement request message. FIGS. 6H and 6I set out actions that may be taken by a receiving STA and a sending STA, respectively, according to an implementation of fields of the fine timing measurement request message shown in FIGS. 4A and 4B. At block 712, a receiving STA may transmit a fine timing measurement request message to a sending STA comprising at least one field specifying a requested period of time between initial fine timing measurement messages of consecutive bursts of fine timing measurement messages (e.g., "Burst Period"). At block 724, the sending STA may transmit at least a fine timing measurement frame to the receiving STA based, at least in part, on a value in the received fine timing measurement request message specifying the requested period of time.

At block 722, a sending STA may receive a fine timing measurement request message such as the fine timing measurement request message transmitted by a receiving STA at block 712 (e.g., including at least one field specifying a requested period of time between initial fine timing measurement messages of consecutive bursts of fine timing measurement messages). At block 724, the sending STA may transmit at least a fine timing measurement frame to the receiving STA based, at least in part, on a value in the received fine timing measurement request message specifying the requested period of time between initial fine timing measurement messages of consecutive bursts of fine timing measurement messages.

Figure 6J:
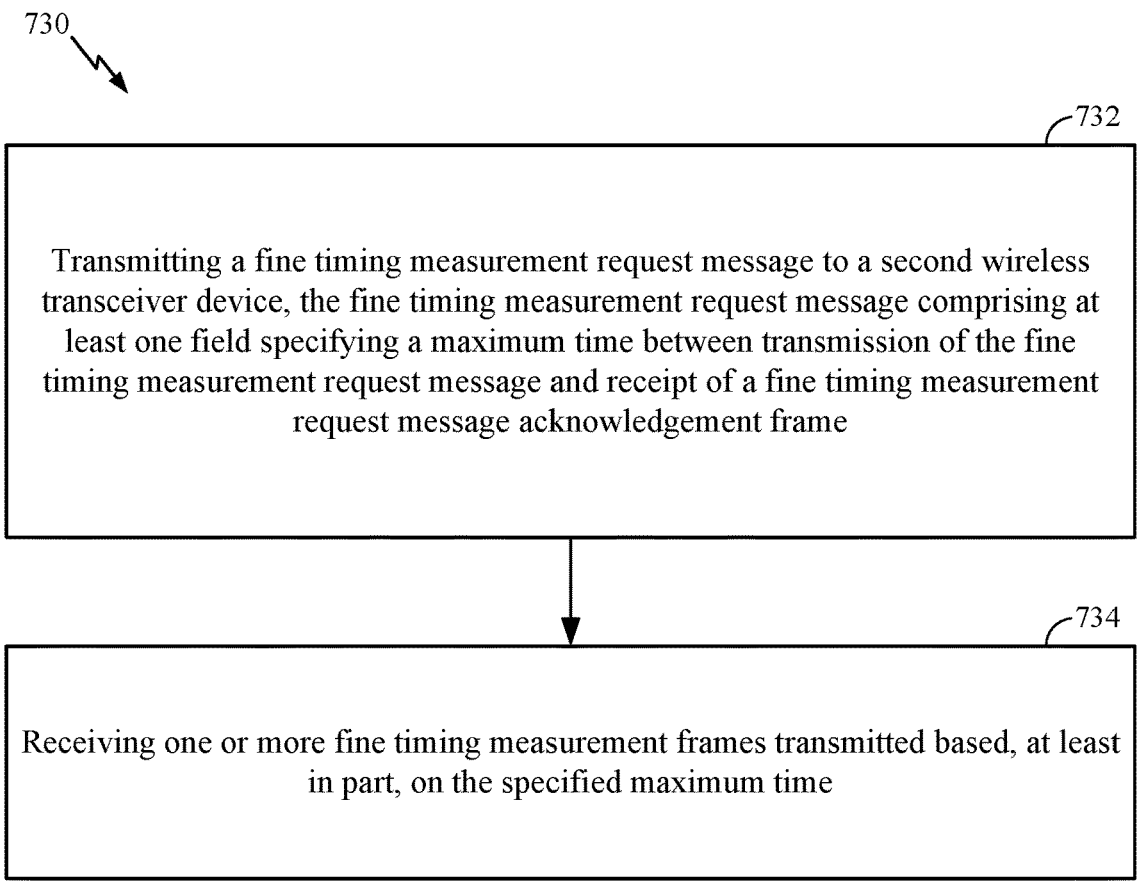
FIGS. 6J and 6K are flow diagrams of processes for exchanging fine timing measurement request frames and fine timing measurement frames by wireless STAs according to an embodiment.
Figure 6K:
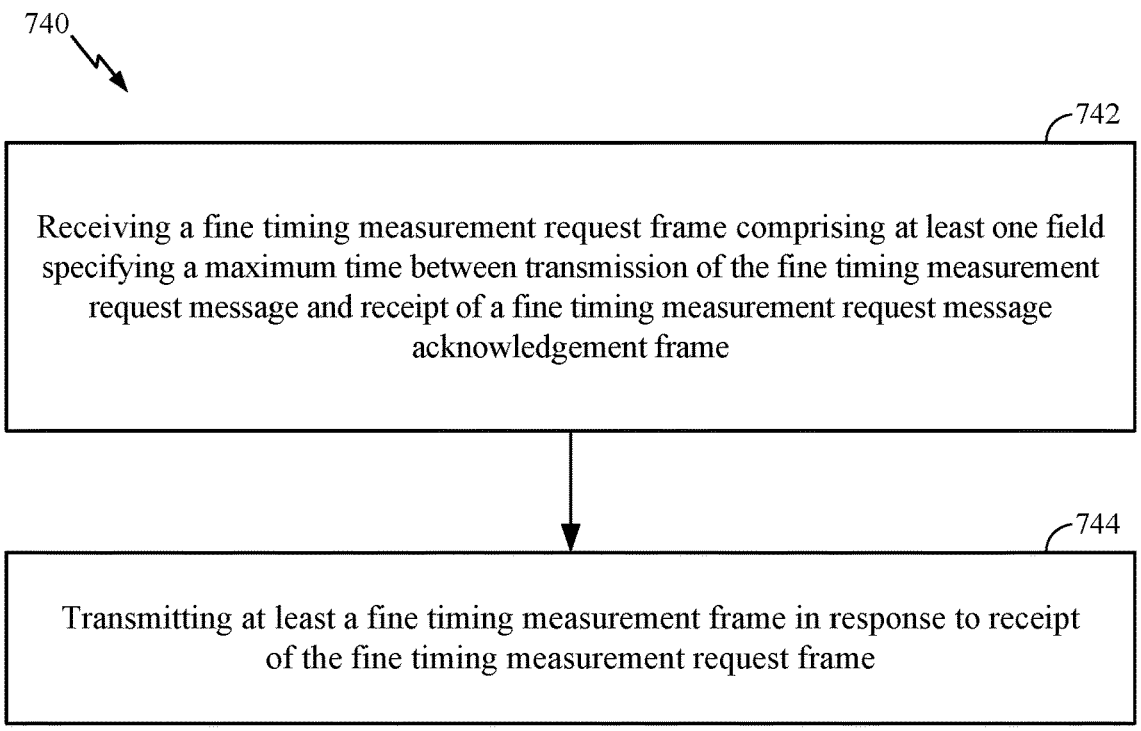

FIGS. 6J and 6K set out actions that may be taken by a receiving STA and a sending STA, respectively, according to an implementation of fields of a fine timing measurement request message such as a fine timing measurement request message as shown in FIGS. 4A and 4B. At block 732, a receiving STA may transmit a fine timing measurement request message to a sending STA comprising at least one field specifying a maximum time between transmission of the fine timing measurement request message and receipt of a fine timing measurement request message acknowledgement frame at the receiving STA (such as the "Timeout" field in FIGS. 4A and 4B). Such a value specifying a maximum time may also be illustrated as a "Timeout" field. At block 734, the receiving STA may receive a fine timing measurement message from the sending STA based, at least in part, on the field specifying the maximum time between transmission of the fine timing measurement request message and receipt of a fine timing measurement request message acknowledgement frame.

At block 742, a sending STA may receive a fine timing measurement request message such as a fine timing measurement request message transmitted at block 732 (e.g., including at least one field specifying a maximum time between transmission of the fine timing measurement request message and receipt of a fine timing measurement request message acknowledgement frame at the receiving STA). At block 744, the sending STA may transmit a fine timing measurement message to the receiving STA in response to receipt of the fine timing measurement request frame received at block 742.

Figure 6L:
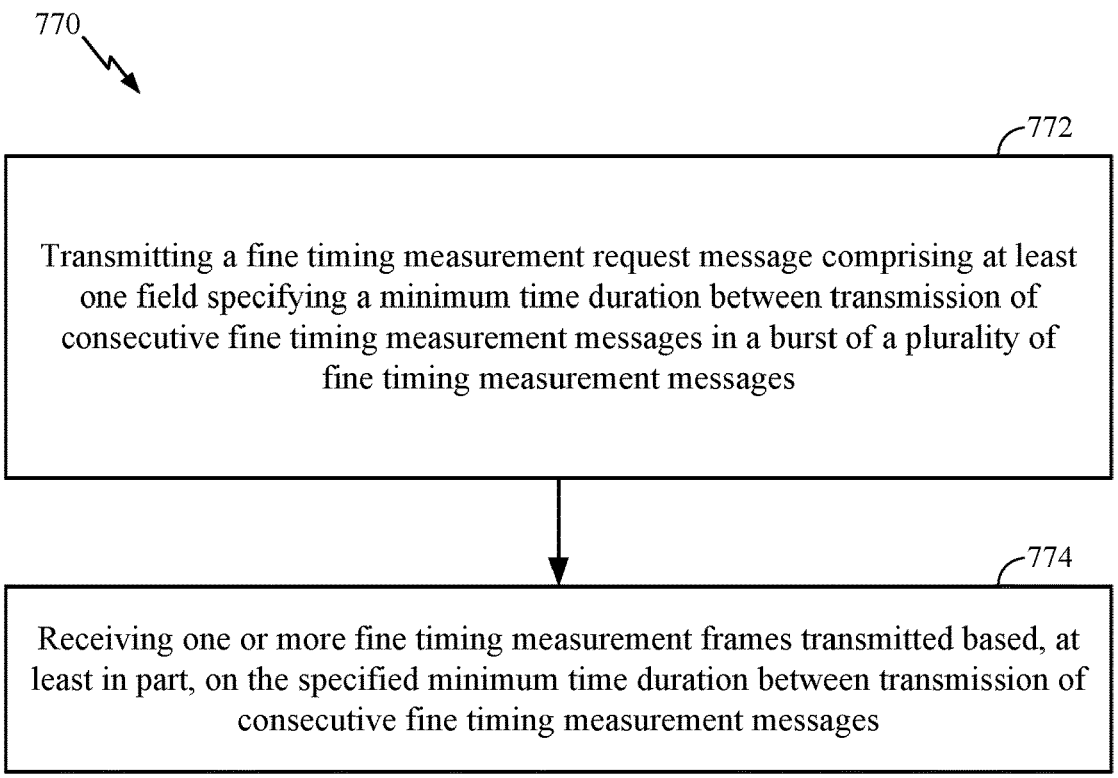
FIGS. 6L and 6M are flow diagrams of processes for exchanging fine timing measurement request frames and fine timing measurement frames by wireless STAs according to an embodiment.
Figure 6M:
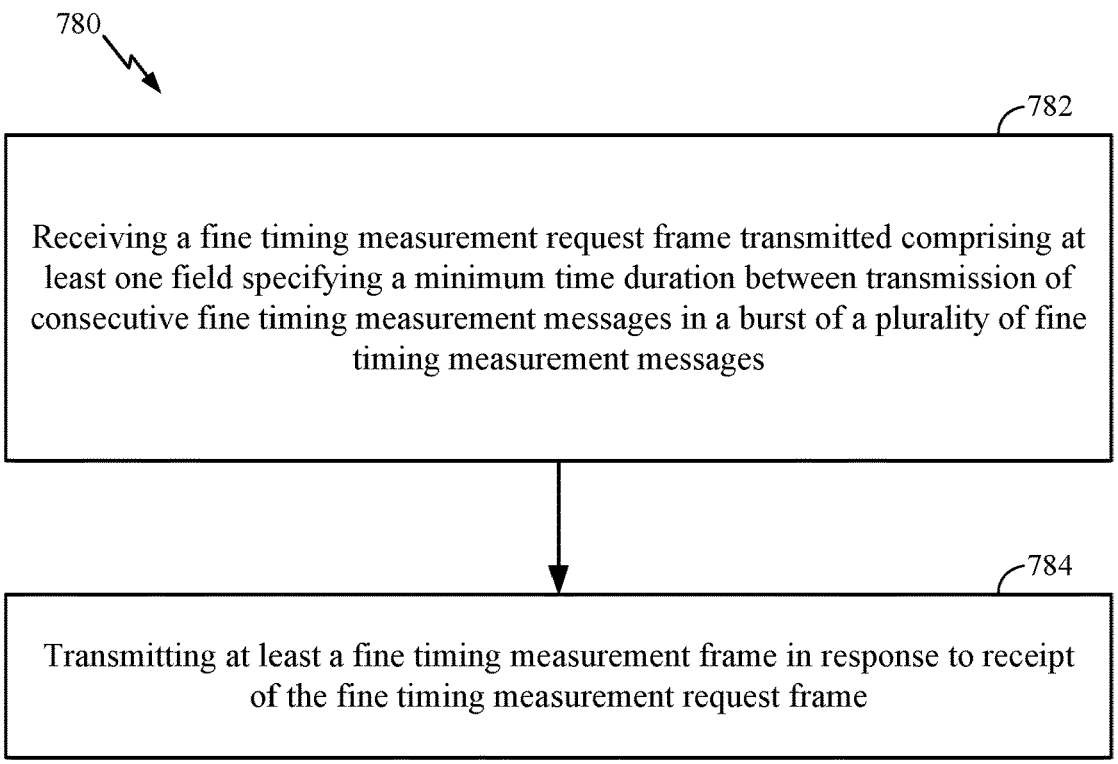

FIGS. 6L and 6M set out actions that may be taken by a receiving STA and a sending STA, respectively, according to an implementation of fields of the fine timing measurement request message shown in FIGS. 4A and 4B. At block 772, a receiving STA may transmit a fine timing measurement request message to a sending STA comprising at least field specifying a minimum time duration between transmission of consecutive fine timing measurement messages to be transmitted in response to the fine timing measurement request message (e.g., as value for Min_delta_T or Min_delta_FTM). At block 774, the receiving STA may receive from the sending STA one or more fine timing measurement frames based, at least in part, on the specified minimum time duration between consecutive fine timing measurement messages.

At block 782, a sending STA may receive a fine timing measurement request message such as a fine timing measurement request message as transmitted at block 772 (e.g., including at least field specifying a minimum time duration between transmission of consecutive fine timing measurement messages to be transmitted in response to the fine timing measurement request message). At block 784, the sending STA may then transmit at least one fine timing measurement message to the receiving STA in response to receipt of a fine timing measurement request message at block 782.

The processes described above with reference to FIGS. 6B through 6M are directed to transmission of a fine timing measurement request message from a receiving STA to a sending STA, followed by transmission of one or more fine timing measurement messages from the sending STA in response to receipt of the fine timing measurement request message. In other implementations, a sending STA may transmit a fine timing measurement request message acknowledgement frame such as that shown in FIG. 5A to indicate, for example, whether the sending STA is capable of providing fine timing measurement messages as specified in fields of the received fine timing measurement request message.

Figure 7B:
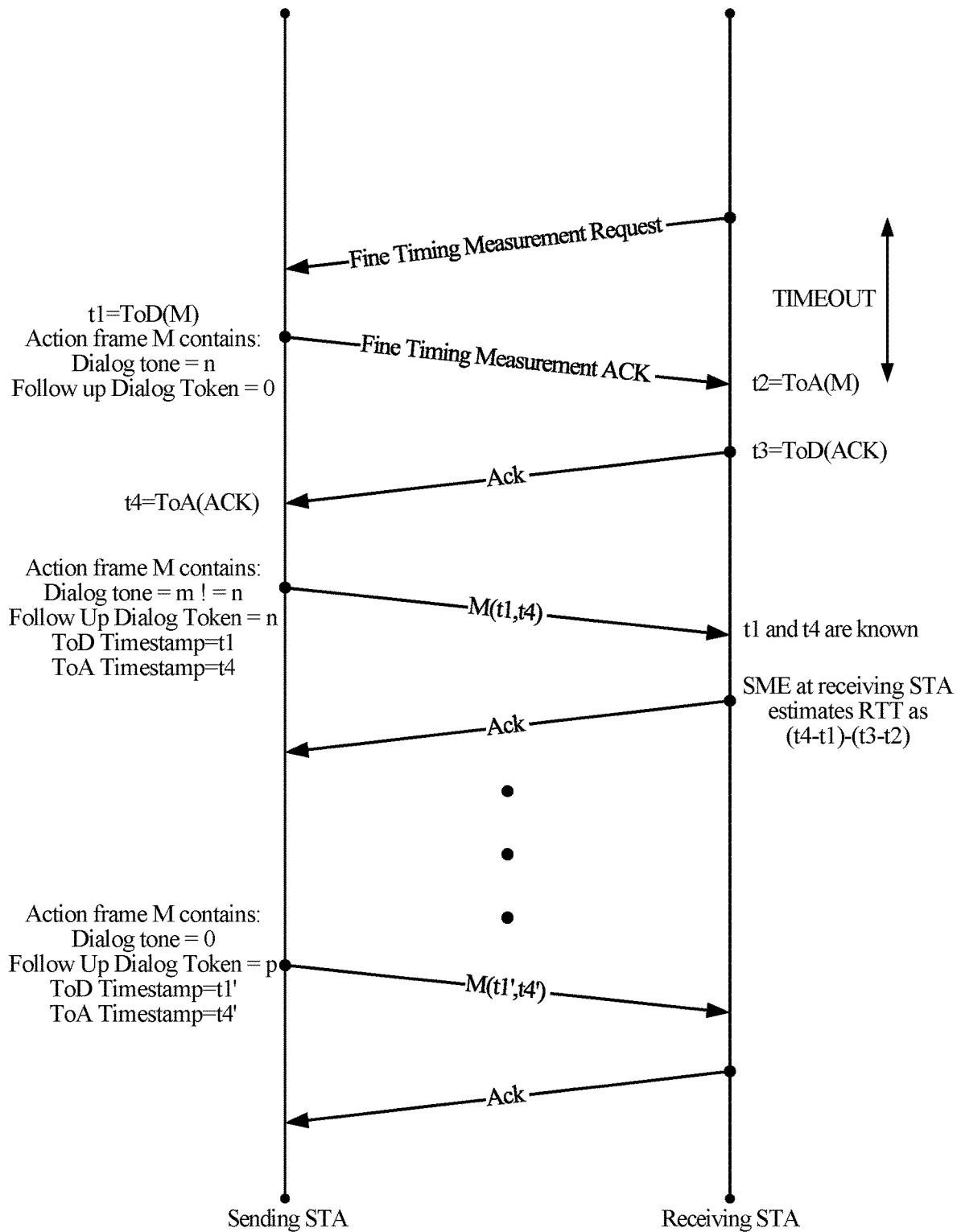
FIG. 7B is a diagram illustrating a message flow between wireless STAs according to another alternative embodiment.

FIG. 7A is a diagram showing fields in a hybrid fine timing measurement request message acknowledgement frame according to an embodiment including a time of arrival field TOA and a time of departure field TOD (which may be transmitted in lieu of a fine timing measurement request message acknowledgement frame as shown in FIG. 5A). Using values for fields TOA and or TOD received in a hybrid fine timing measurement request message acknowledgment frame, a receiving STA may compute RTT (or range based on computed RTT). Here, one or more aspects of a fine timing measurement request message acknowledgement message shown in FIG. 5A may be combined with a fine timing measurement message such that one fewer message may be transmitted from the sending STA to the receiving STA for obtaining an initial RTT measurement in a burst as illustrated in the message flow of FIG. 7B.

Figure 8:
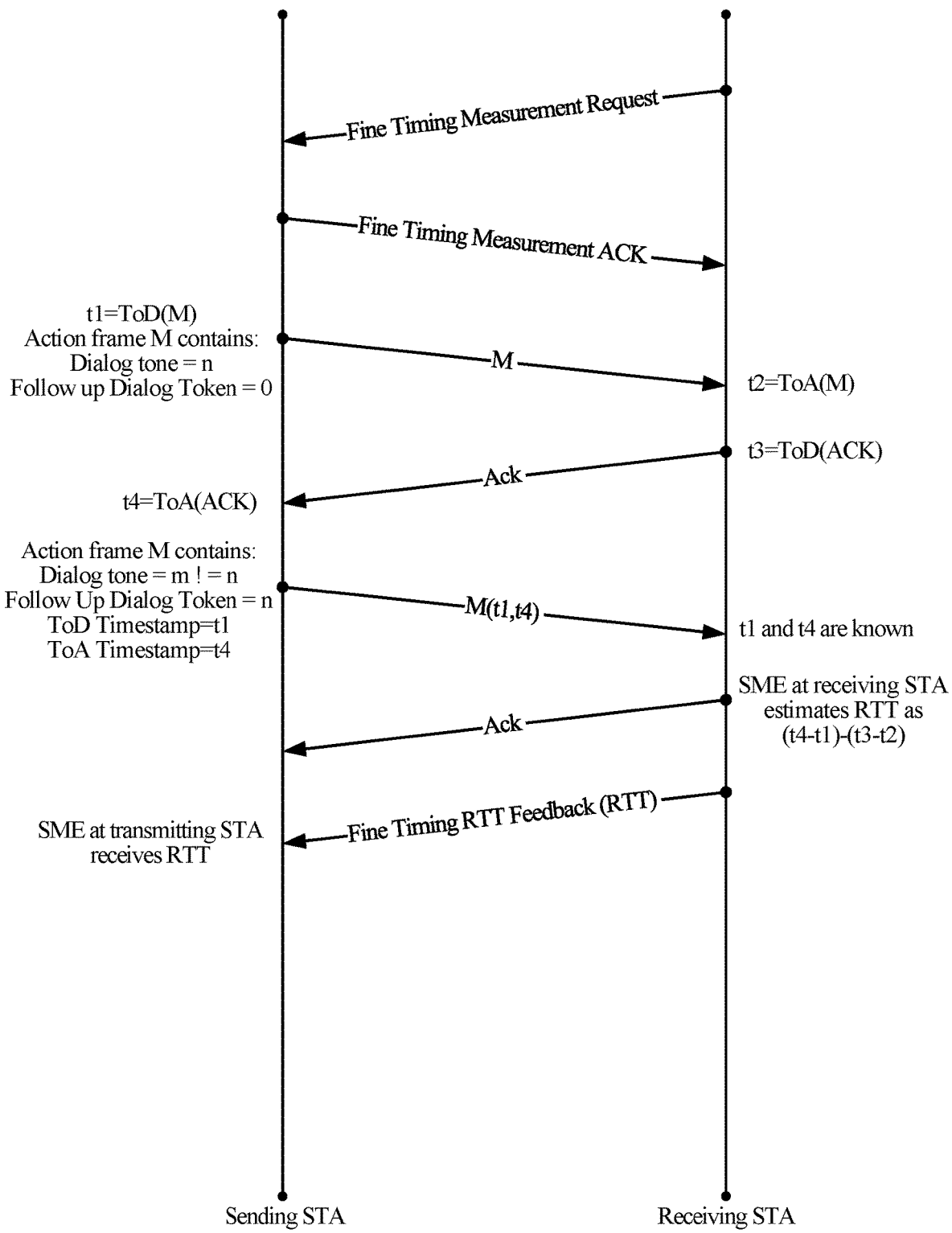
FIG. 8 a diagram illustrating a message flow between wireless STAs according to another alternative embodiment.
Figure 9A:
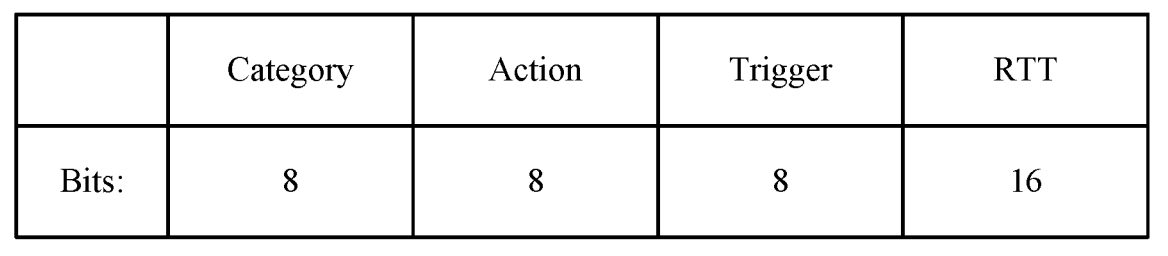

FIG. 8 is a diagram illustrating a message flow in which a receiving STA may provide or feedback an RTT measurement to a sending STA. An example of fields of a fine timing RTT feedback message is shown in FIG. 9A. As pointed out above, a receiving STA may compute an RTT measurement based, at least in part, on based, at least in part, on time stamp values (t1, t4) provided in fine timing measurement messages or frames received from the sending STA. Here, a computed RTT measurement (or range computed from RTT) in a fine timing RTT feedback message received at a sending STA may be used by the sending STA for computing or determining a range between the receiving and sending STAs.

Figure 9B:
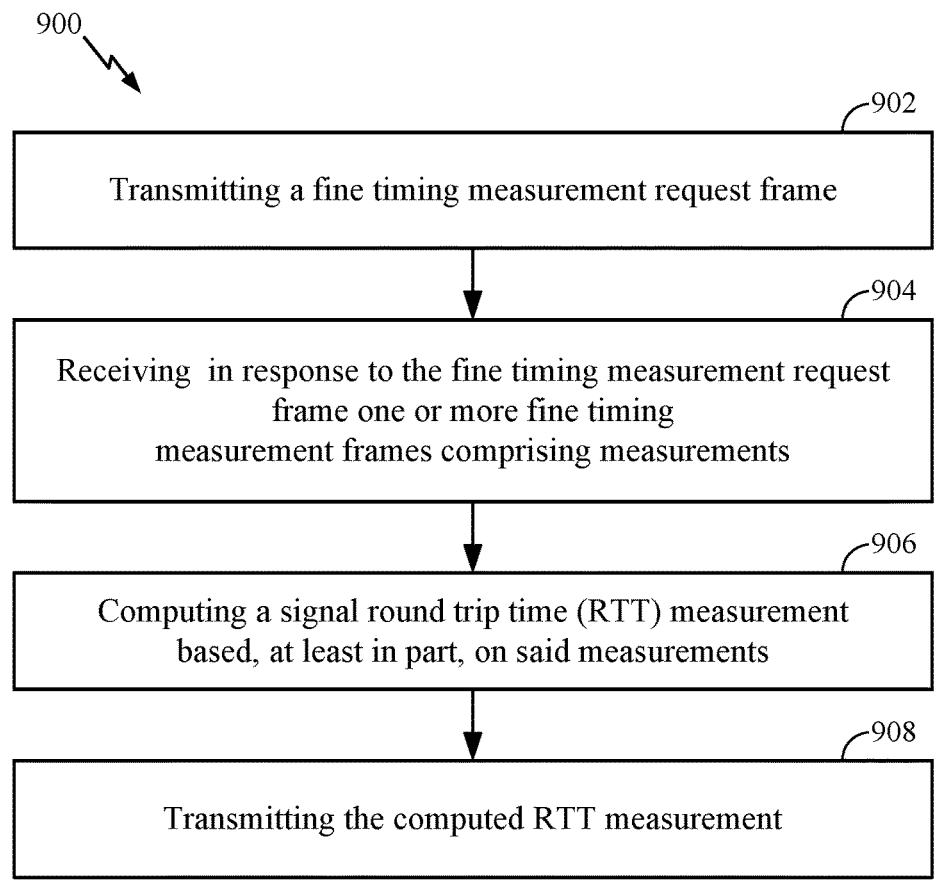
FIGS. 9B and 9C are flow diagrams of processes for exchanging an RTT measurement according to an embodiment.
Figure 9C:
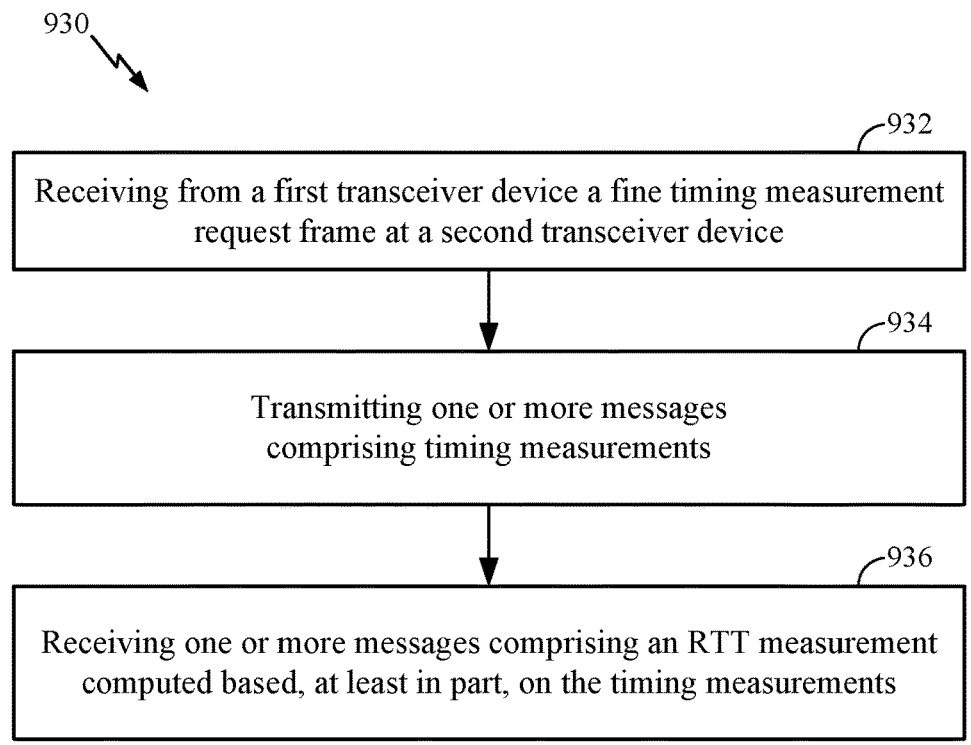
Figure 10A:
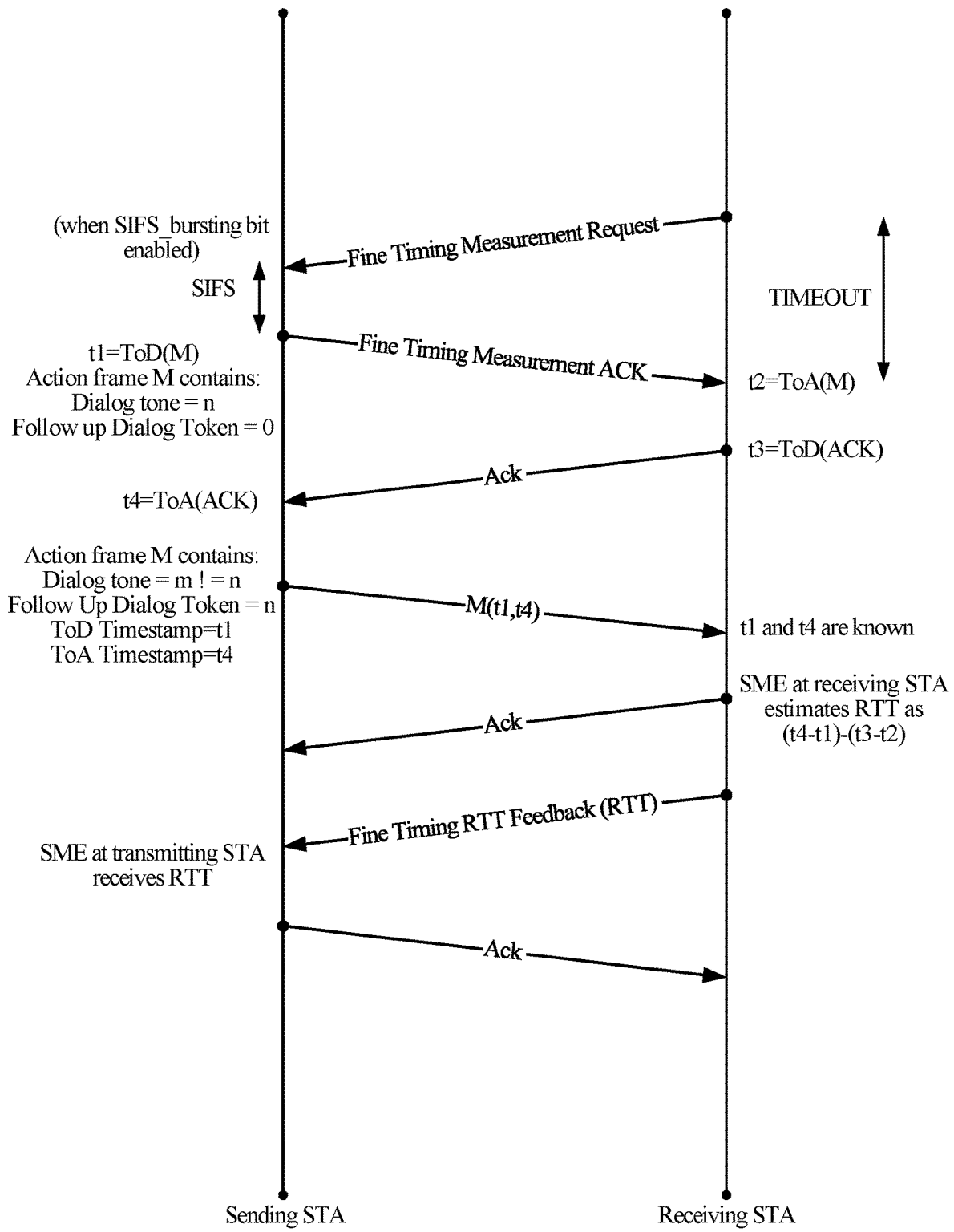
FIG. 10A a diagram illustrating a message flow between wireless STAs according to another alternative embodiment.

FIGS. 9B and 9C set out actions that may be taken by a receiving STA and a sending STA, respectively, according to an implementation of the message flow shown in FIG. 8. At block 902, a receiving STA may wirelessly transmit a fine timing measurement request message or frame to a sending STA. A sending STA may receive the transmitted fine timing measurement request message or frame at block 932 and wirelessly transmit to the receiving STA one or more fine timing measurement messages containing timing measurements (e.g., t1 and t4) at block 934 in response to receipt of the fine timing measurement request frame at block 932. Fine timing measurement messages comprising timing measurements transmitted at block 934 (and in response to the fine timing measurement request frame transmitted at block 902) may be received at a receiving STA at block 904. The receiving STA may then compute a signal RTT measurement at block 906 based, at least in part, on timing measurements received at block 904 using techniques discussed above. The receiving STA may then wirelessly transmit the RTT measurement computed at block 906 to the sending STA at block 908 (e.g., in a fine timing RTT feedback message as shown in FIG. 9A) for use by the sending STA in positioning operations, for example. At block 936, the sending STA may receive the one or more messages comprising the RTT measurement transmitted at block 908 (and computed based, at least in part, on timing measurements transmitted at block 934) for use in positioning operations at the sending STA. In an alternative implementation, a receiving STA at block 902 may transmit a fine timing measurement request frame specifying parameters other than those as provided in fields shown in FIG. 4A. For example, a timeout period may be specified in a Timeout field and a Trigger field may specify SIFS to set out a fixed delay at the sending STA in transmitting a fine timing measurement request message acknowledgment frame on receipt of a fine timing measurement request frame (e.g., as shown in the message flow diagram of FIG. 10A), or on receipt of an acknowledgment frame from the receiving STA in the course of a burst of fine timing measurement messages. FIG. 10A is a diagram illustrating an example message flow that also includes a fine timing RTT feedback message providing a sending STA with a computed RTT measurement (e.g., as transmitted at block 908).

Figure 9D:
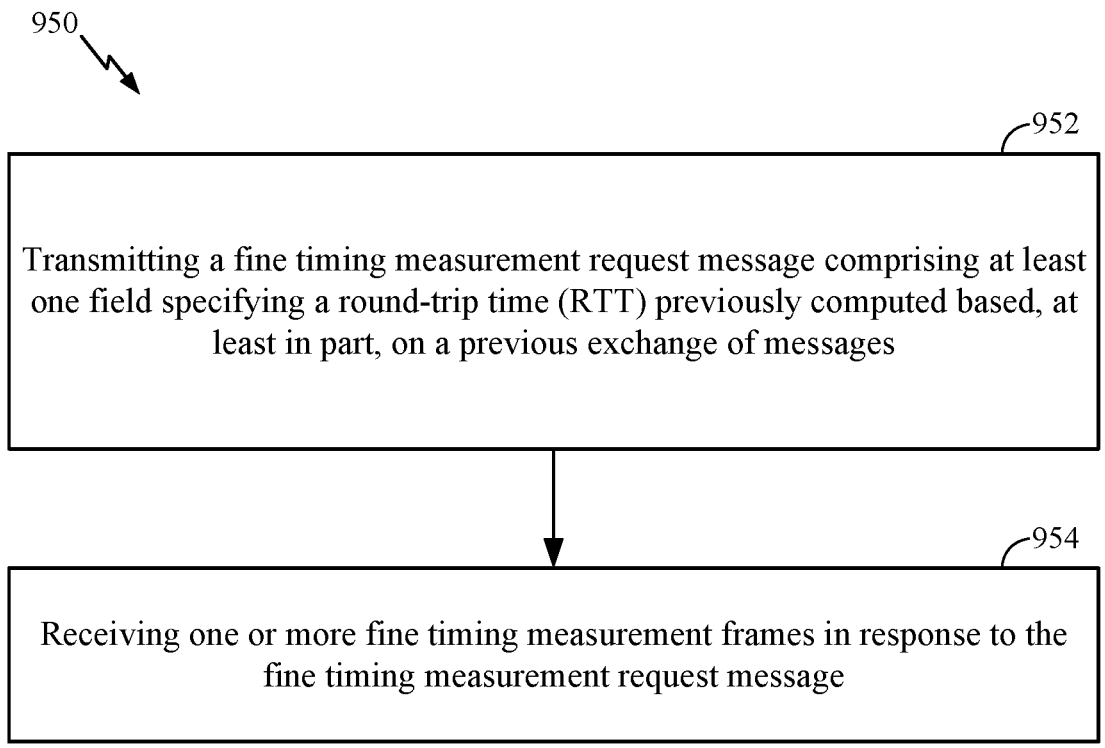
FIGS. 9D and 9E are flow diagrams for exchange of an RTT measurement according to an alternative embodiment.
Figure 9E:
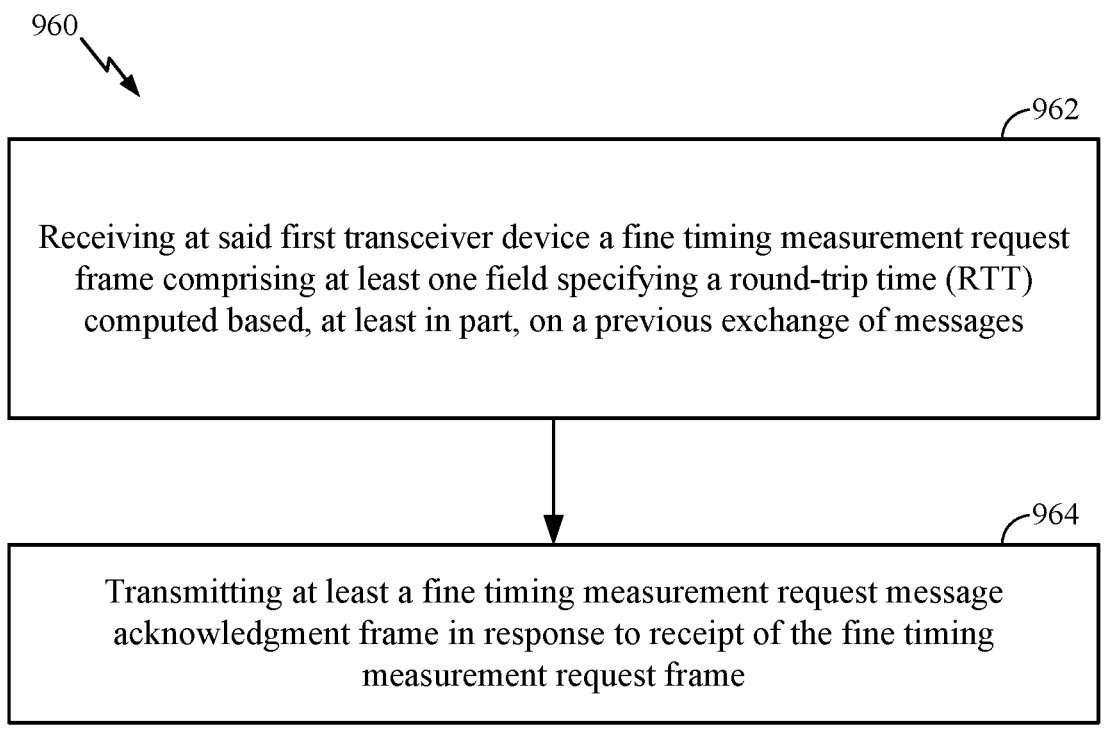

FIGS. 9D and 9E set out actions that may be taken by a receiving STA and a sending STA, respectively, according to an implementation of the message flow shown in FIG. 10A. At block 952 a receiving STA may transmit a fine timing measurement request message to a sending STA including at least one field specifying an RTT measurement previously computed based, at least in part, on a previous exchange of messages between the receiving and sending STAs. The receiving STA may then subsequently receive a fine timing measurement at block 954 which was transmitted by the sending STA in response to receipt of the fine timing measurement request message.

At block 962, a sending STA may receive a fine timing measurement request message such as a fine timing measurement request message transmitted at block 962 (including the at least one field specifying the previously computed RTT). Here, the sending STA may extract from a field in the received fine timing measurement request message an RTT measurement that was computed at the receiving STA based, at least in part, on a previous exchange of messages between the sending and receiving STA. At block 964, the sending STA may then transmit a fine timing measurement request message acknowledgement frame to the receiving STA in response to receipt of the fine timing measurement request message at block 962.

FIG. 10B is a diagram showing fields in a fine timing measurement request frame according to an alternative embodiment. Values for fields "Category," "Action," "Trigger," "Min delta T," "Timeout," "Frames Per Burst" and "Burst Period" may have the same meaning and effect as similarly named fields in the fine timing measurement request frame of FIG. 4A. The particular alternative embodiment of FIG. 10B, however, includes the additional fields of "Offset," "Previous RTT value," and "Channel." Alternative implementations may implement one, two or all three of these additional fields without deviating from claimed subject matter.

The field "Offset" may specify a requested time offset in the commencement of transmission of a fine timing measurement message from a set time (e.g., following receipt of the fine timing measurement request frame). In a particular scenario, a single receiving STA may transmit fine timing measurement request frames to multiple different sending STAs. Specifying different values for an "Offset" field in the different fine timing measurement request frames may be useful, for example, in preventing colliding fine timing measurement request message acknowledgement frames or fine timing measurement frames being transmitted from the multiple sending STAs to the single receiving STA. In a particular implementation, a value for the "Offset" field may specify an offset duration from receipt of the fine timing measurement request frame to transmission of an initial fine timing measurement frame in a burst transmitted in response to the fine timing measurement request frame.

The field "Channel" may specify a specific frequency channel on which a receiving STA requests a responsive message (e.g., fine timing measurement request message acknowledgement frame or fine timing measurement frame) from a recipient sending STA. This may also prevent colliding fine timing measurement request message acknowledgement frames, or colliding fine timing measurement frames being transmitted from multiple sending STAs to a single receiving STA.

The field "Previous RTT value" may indicate an RTT value (e.g., in units of 0.1 ns), or range computed from RTT, previously computed at the receiving STA to the sending STA. For example, the previously computed RTT value may be computed based, at least in part, on a recent exchange of messages between the sending and receiving STAs. The recipient sending STA may then employ the previously computed RTT value in its own positioning operations.

While the additional fields in the fine timing measurement request frame of FIG. 10B may enable enhanced capabilities, a receiving STA may not necessarily implement these capabilities. Here, values in the "Trigger" field may be used to specify which features, if any, are being employed. This may allow a recipient sending STA to properly interpret values in particular fields of a fine timing measurement request message. FIG. 10C is a diagram showing definitions of values in a trigger field in a fine timing measurement request frame (e.g., as shown in FIG. 10B) according to an embodiment. For example, a "1" in the "RTT Value valid" position may indicate that a value in the "Previous RTT value" field is valid. A value of "1" in the "Offset valid" position may indicate that the value in the "Offset" field is valid. A "1" in the "Burst Period valid" position may indicate that a value in the "Burst Period" field is valid. A value of "1" in the "Timeout valid" position may indicate that the value in the "Timeout" field is valid. A value of "1" in the "Min delta T valid" position may indicate that the value in the "Min delta T" field is valid. A value of "1" in the "Not authorized" field is set to 1 by the sending STA when the receiving STA has been rejected multiple times. The value set by the receiving STA in can be either 0 or 1.

FIG. 10D is a diagram showing definitions of values in a trigger field in a fine timing measurement request frame (e.g., as shown in FIG. 10B) according to an embodiment. The bit "Frames per burst valid/accept" may indicate whether a value in the "Frames per burst" field is valid or accepted. The bit "Offset valid/accept" may indicate whether a value in the "Offset" field is valid or accepted. The bit "Burst Period valid/accept" may indicate whether a value in the "Burst Period" field is valid or accepted. The bit "Timeout valid/accept" may indicate whether a value in the "Timeout" field is valid or accepted. The bit "Min delta T valid/accept" may indicate that a value in the "Min delta T" field is valid or accepted.

The bit "Rejected" may be used to indicate that a fine timing measurement request message is rejected by a sending STA. A sending STA may use the bit "Rejected" in combination with the bit "Enable" to indicate any number of things to a receiving STA in connection with a fine timing measurement request message. For example, setting "Rejected" to one and "Enable" to zero may indicate that the receiving STA has been rejected multiple times. Setting both "Rejected" and "Enable" bits to one may indicate that the receiving STA is to try again a duration of a Burst Period later.

FIGS. 10E and 10G are diagrams showing fields in a hybrid fine timing measurement request message acknowledgement frame transmitted by a sending STA in response to receipt of a fine timing measurement request message from a receiving STA according to an alternative embodiment. In this particular implementation, values in fields "Trigger" and "Frames per Burst" may indicate capabilities of the sending STA. For example, the "Frames per Burst" field may indicate a number of frames that the sending STA is capable of transmitting in a given burst. Values in bit positions of the "Trigger" field may indicate capabilities of the sending STA to implement or perform certain features such as "Offset," "Min delta T," "Timeout," "Frames Per Burst," etc. as set forth in the embodiment of the "Trigger" field shown in FIG. 10B.

FIG. 10F is a diagram showing fields of a hybrid fine timing measurement request message acknowledgement frame transmitted by a sending STA in response to receipt of a fine timing measurement request message from a receiving STA according to an alternative embodiment. In a particular implementation, a "Trigger" field in the TOD reserved field may be used by a sending STA to assert control over a fine timing measurement session. Here, a sending STA may use appropriate fields to specify a new "Length," "Min delta T" and/or "Burst Period."

Figure 10H:
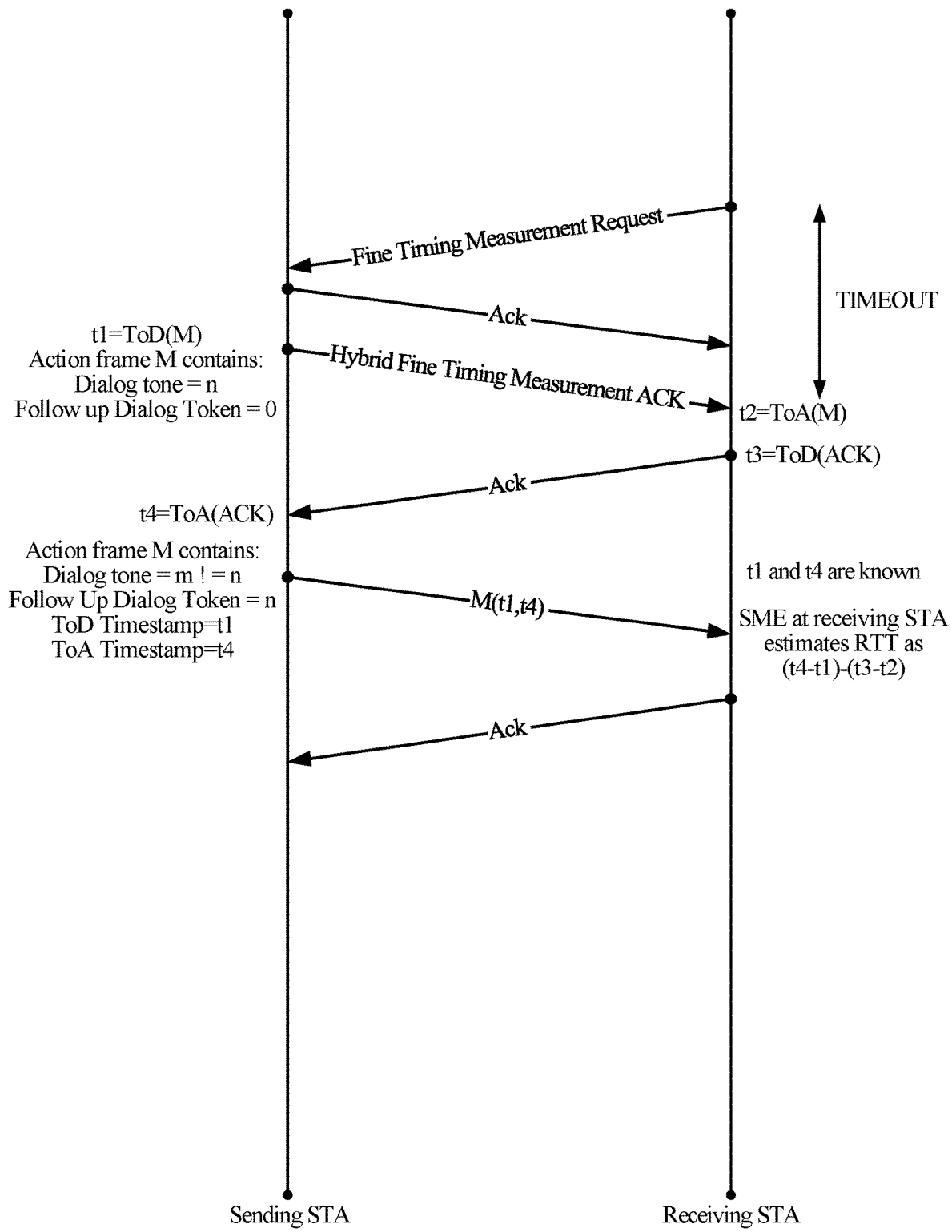
FIG. 10H a diagram illustrating a message flow between wireless STAs according to another alternative embodiment.

The particular implementation of a hybrid fine timing measurement request message acknowledgement frame of FIG. 10G excludes fields "Max TOD Error," "Max TOA Error," "TOA" and "TOD", which may not necessarily be of use in an acknowledgement message transmitted in response to a fine timing measurement request message. Application of the alternative hybrid fine timing measurement acknowledgement frames is shown in the message flow diagram of FIG. 10H at the second message transmitted by the sending STA in response to receipt of a fine timing measurement request message received from a receiving STA.

Figure 19:
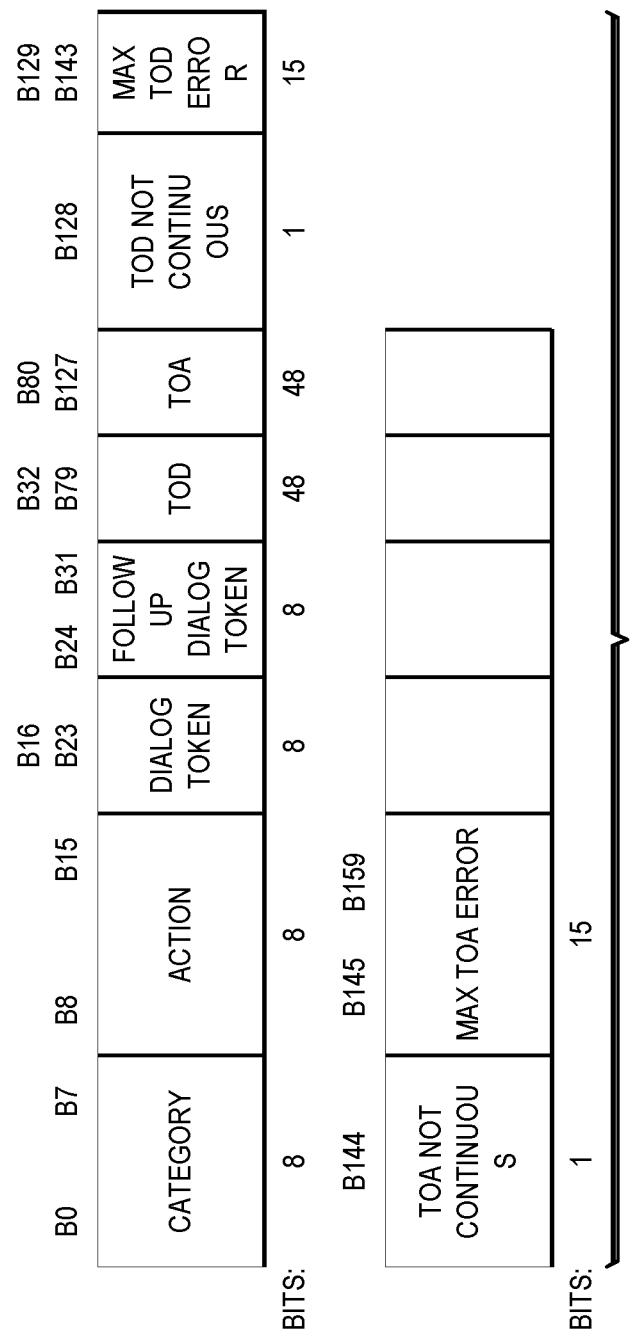
FIG. 19 shows fields for a fine timing measurement message according to an alternative embodiment.

FIG. 19 shows fields in an example format for a fine timing measurement frame according to an alternative embodiment. As shown, fields TOA and TOD comprise 48 bits. In a particular implementation, a sending STA may express TOA and TOD as 48-bit expressions in increments of 0.1 nano seconds using a rolling counter. As the rolling counter exceeds a maximum value for a 48-bit expression for either TOA or TOD, the counter may "wrap around" and begin counting at the minimum or zero value for the 48-bit expression. Additional field "TOD not continuous" may indicate to a recipient receiving STA that value provided in the associated "TOD" field is not continuous with a TOD value in a previous frame. This may occur, for example, if a rolling counter at the sending STA wraps around following the TOD value in the previous frame and before the TOD value in the present fine timing measurement frame. Similarly, additional field "TOA not continuous" may indicate to a recipient receiving STA that value provided in the associated "TOA" field is not continuous with a TOA value in a previous frame. This may occur, for example, if a rolling counter at the sending STA wraps around following the TOA value in the previous frame and before the TOA value in the present fine timing measurement frame.

According to an embodiment, an access point used in positioning operations may search for particular client devices on multiple frequency channels. Switching between different channels may be burdensome to the processing resources of the access point. In a particular implementation, an access point may transmit beacon signals with indications as to the presence or absence of user client devices communicating on particular frequency channels. This may allow neighboring access points in receipt of the beacon signal to avoid searching for user client devices on particular channels if there is a low likelihood of user client devices communicating on the particular channels.

In one example implementation, a portion of a beacon signal may be formatted with fields as follows:
Length, Channel j, Users j, Channel k, Users k, Channel l, Users l, Channel m, Users m.

Here, "Length" indicates a number of channels for which there is an indication to enable a recipient access point to parse remaining fields. In this particular example, there are indications for four channels: channels j, k, l, and m. For each channel there is an indication of a number of users on the particular corresponding channel denoted as Users j, Users k, Users l and Users m.

Figure 10I:
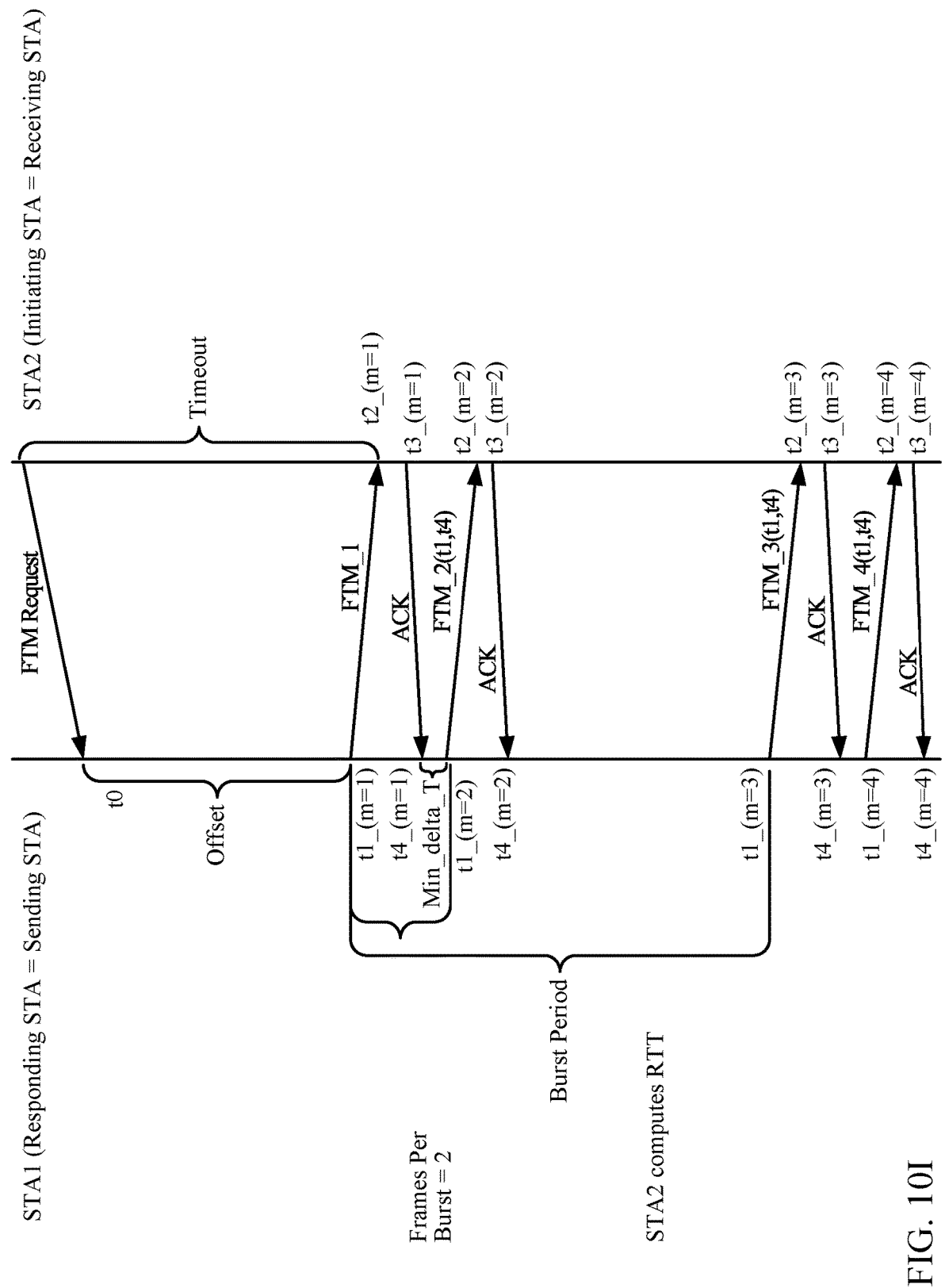
FIG. 10I is a diagram illustrating a message flow according to an alternative embodiment.

FIG. 10I is a diagram illustrating a flow according to an alternative embodiment. In this particular implementation, "offset" in a fine timing measurement request message specifies a duration between receipt of a fine timing measurement request frame at a sending STA (and transmitted by a receiving STA) and transmission of a responsive fine timing measurement message from the sending STA. This may enable a closer referencing of the offset duration to other transmission times such as, for example, the times of transmission of bursts with respect to receipt of a fine timing measurement request message at a sending STA. In addition, this particular implementation a value for a field "Min_delta_FTM" or "Min_delta_T" in a fine timing measurement request frame now specifies a desired or requested minimum duration of time from receipt of an acknowledgement message at a sending STA and transmission of a fine timing measurement message in response to the acknowledgement message received from the receiving STA.

FIG. 10J is a diagram illustrating fields of a fine timing measurement request message according to an alternative embodiment. In this particular implementation, a value for the field "Length" may specify a length of the fine timing measurement request message in bytes. Values for fields "Min_delta_FTM" and "Offset" may be deemed particularly important or useful, and immediately follow the "Length" field. As such, the "Length" field may specify a truncation of a fine timing measurement request message to exclude fields "Burst Period," "Frames Per Burst" and "Timeout," but still include fields "Min_delta_FTM" and "Offset." FIG. 10K is a diagram showing definitions of a trigger field in a fine timing measurement frame according to the ordering of fields set forth in the alternative implementation of a fine timing measurement request message shown in FIG. 10L. Similarly, FIG. 10L is a diagram showing definitions including of fields in a hybrid fine timing measurement request message acknowledgement frame, including definitions of a trigger field according to the ordering of fields set forth in the alternative implementation of a fine timing measurement request frame shown in FIG. 10L, according to an embodiment.

FIG. 10M is a diagram illustrating fields of a fine timing measurement request message according to an embodiment. Afield Min_delta_FTM may indicate a minimum time between consecutive fine timing measurement frames. A value in field Burst Timeout may specify a duration of time that a receiving STA (e.g., STA2 in FIG. 10N) may be allowed to go off-channel or to sleep to conserve power. This value may be expressed as either a percentage of a value indicated in Burst Period or in units of ms., for example. A value for FTM1 Timeout may indicate how much time a receiving STA (e.g., STA2 in FIG. 10N) is to wait for a first fine timing measurement message to be received following transmission of the fine timing measurement request message. A value in the field MCS may indicate a modulation and coding scheme for providing fine timing measurements. In one example implementation, a higher modulation and coding scheme may indicate a shorter frame that is less robust and more likely to require retransmission. A value for BW may indicate a bandwidth for which fine timing measurement frames are to be transmitted (e.g., specifying 20 MHz, 40 MHz, 80 MHz or 160 MHz).

Figure 10N:
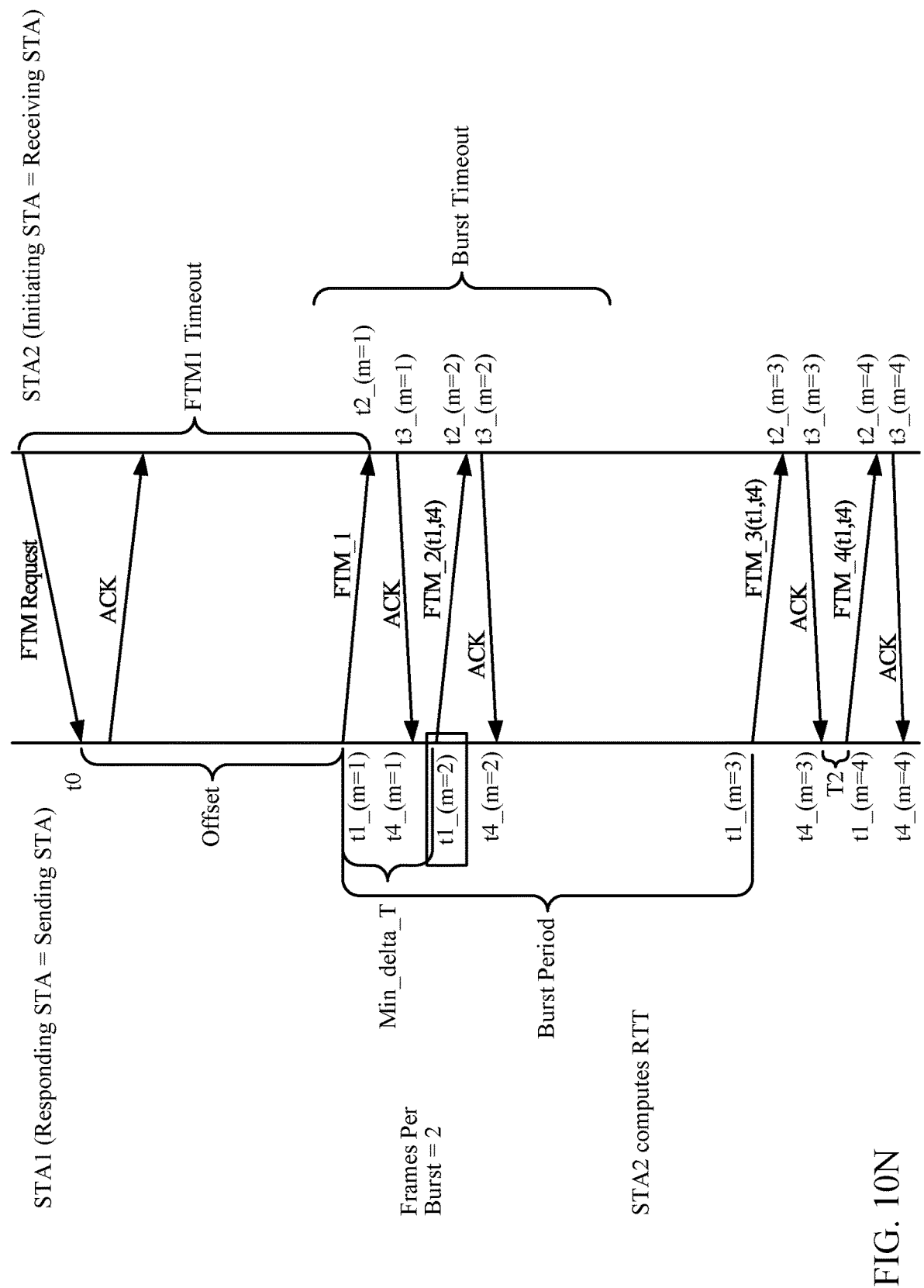
FIG. 10N is a diagram illustrating a message flow according to an embodiment.

FIG. 10N is a diagram illustrating a message flow according to an embodiment. Here, an offset as determined by a value in a Burst Offset field of the fine timing measurement request message shown in FIG. 10M may be determined from receipt of a fine timing measurement request message at a sending STA to transmission of an initial fine timing measurement message in a burst of fine timing measurement message in response to the fine timing measurement request message. The receiving STA may also compute a round trip time based, at least in part, on exchange of fine timing measurement messages and acknowledgements in a burst as pointed out above.

An STA may transmit a fine timing measurement request frame as a broadcast or individually addressed frame. A STA that supports FTM and receives a broadcast fine timing measurement request frame may only send a fine timing measurement response frame if the STA does not accept the parameters included in the fine timing measurement request message.

An STA that supports fine timing measurement exchanges and receives an individually addressed fine timing measurement request message may respond with a fine timing measurement frame. Upon successful reception of a new fine timing measurement request frame, the STA may override any previously received fine timing measurement request frame with the new frame. If all fine timing measurement parameter subelements included in the fine timing measurement request message are successfully configured on a sending STA, then the sending STA may include in a fine timing measurement response frame a single fine timing measurement status subelement indicating success. Upon successful configuration, a sending STA may start transmitting the fine timing measurement frames based, at least in part, on the fine timing measurement request frame parameters. If one or more fine timing measurement parameter subelements not successfully configured at a sending STA, the sending STA may include in a fine timing measurement response frame a fine timing measurement status subelement for each failed subelement indicating the subelement ID, the status value and the corresponding fine timing measurement parameter subelement as described below.

FIG. 10O is a diagram illustrating fields of a fine timing measurement request message according to an embodiment. Here, a field "Dialog Token" may indicate a nonzero value that is unique to the transmitted fine timing measurement request message among fine timing measurement request messages transmitted to a particular destination MAC address. This may allow a STA responding to the fine timing measurement request message to include the same nonzero value in a response message to indicate that the response message is responding to the fine timing measurement request message with the nonzero value as its Dialog Token. FTM indication parameters may include multiple fields to indicate how measurements are to be obtained. In a particular example, implementation, FIG. 10P shows FTM Indication Parameters as fields "Length" through "FTM1 Timeout."

The field FTM indication channels may specify desired frequency channel(s) for transmission of a fine timing measurement message transmitted in response message to the fine timing measurement request message. This may be implemented as a replacement for field BW in the fine timing measurement request message of FIG. 10M. The field FTM Indication Broadcast Data Rate may indicate a desired data rate for transmitting fine timing measurement messages in response to the fine timing measurement request message.

Figure 10Q:
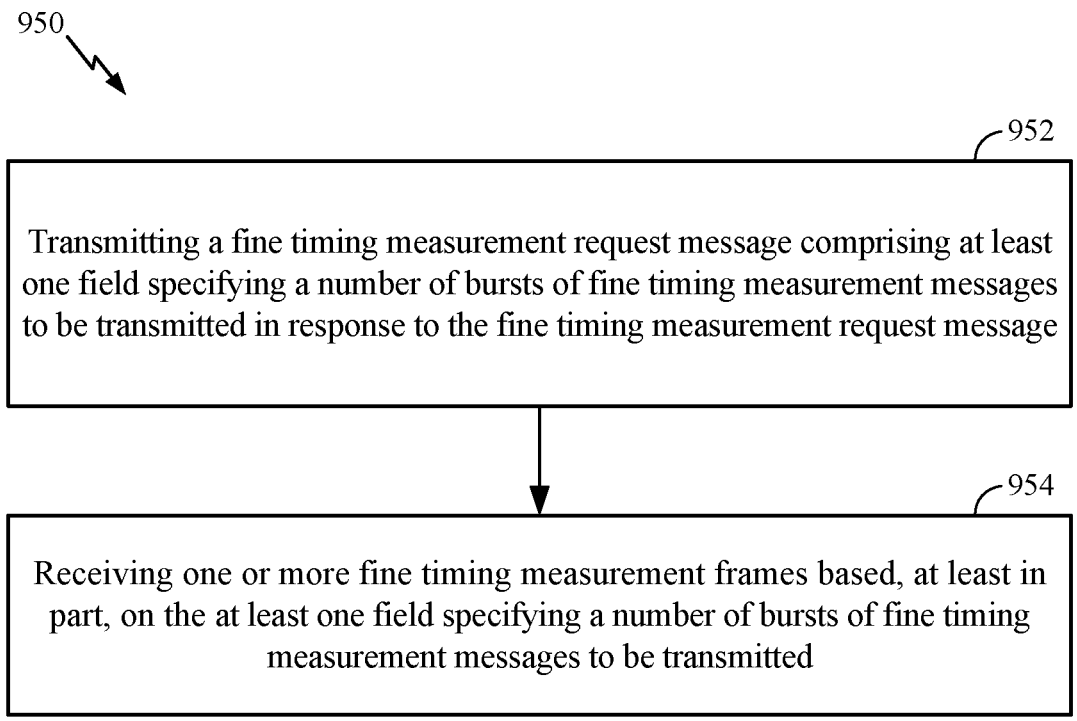
FIGS. 10Q and 10R are flow diagrams of processes for exchanging fine timing measurement request frames and fine timing measurement acknowledgement frames by wireless STAs according to an embodiment.
Figure 10R:
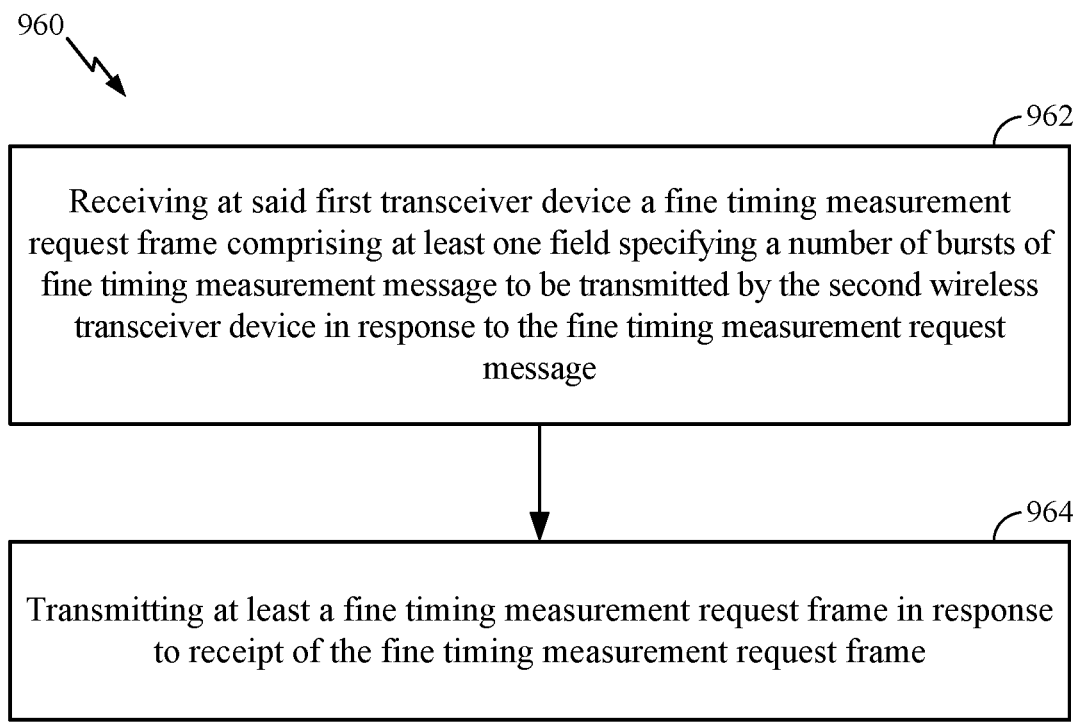

The fine timing measurement request messages shown in FIGS. 10P and 10Q include fields "Number of bursts" to specify a number of requested bursts of fine timing measurement messages to be provided by a sending STA. FIGS. 10Q and 10R set out actions that may be taken by a receiving STA and a sending STA, respectively, according to an implementation of fields of the fine timing measurement request message shown in FIGS. 10P and 10S. At block 952, a receiving STA may transmit a fine timing measurement request message to a sending STA comprising at least one field specifying a number of bursts of fine timing measurement messages to be transmitted by the sending STA in response to the fine timing measurement request message. At block 954, the receiving STA may receive from the sending STA one or more fine timing measurement frames based, at least in part, on the specified number of bursts indicated in the fine timing measurement request message received at block 952.

At block 962, a sending STA may receiving a fine timing measurement request message such as a fine timing measurement request message as transmitted at block 952 (e.g., including at least one field specifying a number of bursts of fine timing measurement messages to be transmitted by the sending STA in response to the fine timing measurement request message). At block 964, the sending STA may then transmit at least one fine timing measurement message to the receiving STA in response to receipt of a fine timing measurement request message at block 962.

According to an embodiment, a STA that transmits a fine timing measurement request message to another STA, such as a receiving STA may be referred to as an "initiating STA." Similarly, a STA that provides fine timing measurement messages in response to a fine timing measurement request message, such as a sending STA, may be referred to as a "responding STA."

As pointed out above, an initiating STA may vary and/or tailor fields in a fine timing measurement request message. FIG. 10S is a diagram illustrating fields that make up "FTM Indication Parameters" (e.g., parameters in fields characterizing the delivery of fine timing measurements such as number of bursts, frames per burst, burst timeout, burst period, Min_delta_FTM, FTM1 Timeout) in a fine timing measurement request message following a "Subelement ID" field according to a particular alternative embodiment. The field "Subelement ID" may allow an initiating STA to vary and/or tailor fields in a fine timing measurement request message. This may allow a responding STA receiving the fine timing measurement request message to properly parse fields in the received fine timing measurement request message. As indicated in Table I below in a particular implementation, a value of "1" for Subelement ID may indicate that the FTM Indication parameters are to be included. A value of "2" for Subelement ID may indicate that FTM Indication Channels (e.g., frequency channels in which fine timing measurement messages are requested to be transmitted) is included in the fine timing measurement request message, and that FTM Indication parameters and FTM Indication Broadcast Data Rate are to be excluded. A value of "4" for Subelement ID may indicate that FTM Indication Broadcast Data Rates are to be included in the fine timing measurement request message, and that FTM Indication Channels and FTM Indication Broadcast Data Rate are to be excluded. This is summarized in Tables I and II below according to particular examples.

TABLE I

| Allowed subelement fields | Subelement ID | Notes |
| --- | --- | --- |
| FTM Indication Parameters | 1 | The FTM Indication Parameters subelement may be included in the FTM Configuration Response frame. |
| FTM Indication Channels | 2 | The FTM Indication Channels subelement may be included in the FTM Configuration Response frame. |
| FTM Indication Broadcast Data Rate | 4 | The FTM Indication BroadcastData Rate subelement may be included in the FTM Configuration Response frame. |
| Vendor Specific Information | 221 | The Vendor Specific Information subelement may be included in the FTM Configuration Response frame. |

TABLE II

| Allowed subelement fields | Subelement ID | Notes |
| --- | --- | --- |
| FTM Indication Parameters | 1 | The FTM Indication Parameters subelement may be included in the FTM Configuration Response frame. |
| FTM Indication Channels | 2 | The FTM Indication Channels subelement may be included in the FTM Configuration Response frame. |
| FTM Status | 3 | The FTM Status subelement is included in the FTM Configuration Response frame. If all configuration of the subelements contained in a FTM Configuration Request frame was successful, then a single FTM Status subelement is included in the FTM Configuration Response frame. For each subelement contained in the FTM Configuration Request frame that is not successful a FTM Status subelement is included in the FTM Configuration Response frame that indicates the subelement ID and the unsuccessful status code for that subelement ID. |
| FTM Indication Broadcast Data Rate | 4 | The FTM Indication Broadcast Data Rate subelement may be included in the FTM Configuration Response frame. |
| Vendor Specific Information | 221 | The Vendor Specific Information subelement may be included in the FTM Configuration Response frame. |

FIG. 10T is a diagram illustrating fields that make up a fine timing measurement frame according to an embodiment. As pointed out above, a value of field "Dialog Token" may indicate a specific fine timing request message to which the fine timing measurement frame is responding. In the particular implementation of FIG. 10U, a fine timing measurement frame may further include a field "Follow-up Dialog Token" which specifies a most recent fine timing measurement request message for which a fine timing measurement frame was transmitted.

A value in field FTM Indication Channel may indicate a frequency channel that is selected for transmitting fine timing measurement messages and a value in field FTM Indication Broadcast Data Rate may indicate a data rate selected. A value in field "FTM Status" may indicate a status of a request to which the response message is responding. Example values and descriptions for the FTM status field are shown in Table III below.

TABLE III

| Event Report Status | |
| --- | --- |
| Event Report Status | Description |
| 0 | Successful |
| 1 | Request failed |
| 2 | Request refused |
| 3 | Request incapable |
| 4 | Don't send new request for X seconds |
| 5-255 | Reserved |

The FTM Status subelement has four possible status values: Success, Fail, Refused and Incapable. If an initiating STA receives a fine timing measurement frame with FTM Status indicating anything other than Success, the initiating STA may assume the original fine timing measurement request message was not processed, and that no configuration had taken effect on the responding STA. Here, the initiating STA may take appropriate action based on the status value returned.

For FTM Status Fail, if the responding STA has been configured successfully prior to a current fine timing measurement request message and continues to transmit fine timing measurement frames based on those parameters, the responding STA may respond according to current FTM Parameters subelements values being employed by the responding STA. If the responding STA has no previously configured value, the responding STA may respond according to particular FTM Parameters subelements that the responding STA is capable of supporting. Also, the initiating STA may either retry the original request or send an alternate request.

For FTM Status Incapable, a responding STA may apply particular FTM Parameters subelements that it is capable of supporting. An initiating STA may then not send another fine timing measurement request message matching a previous fine timing measurement request message while the responding STA (e.g., implemented as an IEEE std. 802.11 access point) is associated to the same basic service set (BSS). The initiating STA may transmit an alternate fine timing measurement request message.

For FTM Status Refuse, a responding STA may incorporate FTM Parameters subelements that it is capable of supporting. The initiating STA may then send an alternate fine timing measurement request message.

An alternative implementation of FTM Status indications is shown in TABLE IV below. Here, a value of "2" in a status field indicates that one or more fields in a fine timing measurement request message is to be overridden in the execution of providing fine timing measurement messages in response to the fine timing measurement request message.

TABLE IV

Event Report Status

| Status | Description |
|---|---|
| 0 | Reserved |
| 1 | Successful. Indicates FTM exchange about to begin. Accepted all fields |
| 2 | Overriden. Indicates FTM exchange about to begin. Override of 1 or more fields. |
| 3 | Request incapable (do not send same request again) |
| 4 | Request failed. Do not send new request for X seconds |
| 5-15 | Reserved |

FIG. 10V shows example fields of a fine timing measurement request message acknowledgement including fields specifying a "Transmit Power," "Antenna Gain" and "Antenna ID." The Transmit Power field may specify a transmit power that is being used by a sending STA to transmit fine timing measurement messages as a signed integer, one octet in length, and reported in unites of dBm. Here, a value—128, for example, may indicate that the transmit power for transmitting fine timing measurement messages is unknown. The Antenna Gain field may specify a peak antenna gain in dBi of an antenna employed at the sending STA for transmitting fine timing measurement messages. The Antenna ID field may specify an identifier of an antenna used at a sending STA in transmission of fine timing measurement messages. A valid range for a value specified in Antenna ID may be 1 to 254. A value of zero in the field Antenna ID may indicate that the antenna identifier is unknown.

Figures 17, 18:
FIG. 17 shows fields of a fine timing request message acknowledgement according to an embodiment.
FIG. 18 shows an example format for values to be provided in a pressure field of a fine timing measurement request message according to an embodiment.

According to an embodiment, it may be desirable for a receiving STA to determine a relative altitude of a sending STA to, for example, assess the usefulness of the sending STA in providing measurements for use in positioning operations. For example, sending and receiving STAs may comprise barometric pressure sensors. Providing barometric pressure measurements obtained at a sending STA to a receiving STA may enable the receiving STA to approximate an altitude of the sending STA relative to the receiving STA. FIG. 17 shows fields of a fine timing measurement request message acknowledgement including a 34-bit "Pressure" field. FIG. 18 shows a format of such a Pressure field according to a particular implementation comprising a 6-bit portion specifying a resolution, a second portion specifying a fractional portion and a third portion specifying an integer portion. It should be understood, however, that this is merely a sample format for specifying a barometric pressure and that claimed subject matter is not limited in this respect.

As pointed out above according to particular implementations, a receiving STA may obtain time stamp values and/or measurements based on time stamp values for computing RTT, for example. In yet additional implementations, a receiving STA may share these time stamp values and/or measurements with a sending STA (e.g., in an acknowledgement message transmitted in response to a fine timing measurement message transmitted by the sending STA). FIG. 13 shows fields of a fine timing measurement request message including at least one field indicating a willingness of the receiving STA in sharing or providing obtained time stamp values and/or measurements with a sending STA (shown as a single bit in the presently illustrated embodiment). In a particular implementation, an additional event report status indication from a sending STA (e.g., in addition to or in lieu of possible status indications in TABLES III and IV) may indicate a refusal to provide fine timing measurement messages if the receiving STA indicates in a fine timing measurement request message an unwillingness to share time stamps and/or measurements derived from time stamps.

In particular scenarios, a responding STA may receiving conflicting requests from different fine timing measurement request messages (e.g., transmitted from different initiating STAs). Here, a responding STA may respond to different conflicting fine timing measurement request messages according to a particular hierarchy, from highest to lowest priority as follows: 1) a fine timing measurement request frame addressed specifically to the responding STA, 2) a broadcasted fine timing measurement request frame. If a responding STA receives a new fine timing measurement request frame at the same or higher priority than a previous fine timing measurement request message, the responding STA may cancel a previous configuration and begin applying new parameters in the latest fine timing measurement request message.

An FTM Indication Broadcast Data Rate subelement included in a fine timing measurement request frames may indicate that a target data rate at which a responding STA is to transmit fine timing measurement frames. An FTM Indication Broadcast Data Rate included in a fine timing measurement request frame may indicate a data rate defined in a basic data rate set. An Indication Multicast Address field included in FTM Indication Parameters subelement may comprise a multicast locally administered IEEE MAC address as defined in IEEE Std 802.11 that is shared across all APs in the same extended service set (ESS). A responding STA may transmit fine timing measurement frames to the Indication Multicast Address with a BSS identifier (BSSID) field set to the wildcard BSSID. An initiating STA may discard fine timing measurement frames that are not addressed to the Indication Multicast Address field configured for the ESS. In a particular implementation, a non-AP STA may terminate the transmission of fine timing measurement frames for any of the following reasons:

a. the non-AP STA receives a fine timing measurement request frame from the STA to which it is currently associated that includes a FTM Parameters element with a FTM Indication Parameters subelement specifying an interval of 0;

b. the non-AP STA fails to detect any beacon frames, belonging to the same ESS that originally configured the non-AP STA, for the period specified by the essDetectionInterval value included in the FTM Parameters element transmitted in the Fine Timing Measurement Request frame received at the non-AP STA;

c. the non-AP STA is disassociated for any reason from the ESS that configured it, including power off, or is configured by a different ESS; or d. in an independent basic service set (IBSS), the non-AP STA detects that it is no longer connected to the other STA that formed the IBSS.

FIG. 14 shows fields that may specify fine timing indication parameters according to particular implementation of a fine timing measurement request message according to an implementation. Here, an 8-bit field indicates a requested "FTM channel spacing" which indicates a desired bandwidth to be used in transmitting fine timing measurement messages in response to the fine timing measurement request message. A higher channel spacing as indicated in the fine timing measurement request message may enable transmission of a corresponding higher accuracy or higher precision measurements in a fine timing measurement transmitted in response to the fine timing measurement request frame. An example 8-bit encoding of a fine timing measurement channel spacing is shown in the table of FIG. 15A in which the bottom row shows possible values for the "FTM channel spacing" field and the top row shows corresponding fine timing measurement channel spacing in M Hz. An alternative example of a fine timing measurement channel spacing is shown in the table of FIG. 15B in which an encoding type may also be specified. For example, channel spacing values 12, 13 and 14 specify 20.0 MHz, but indicate non-HT (e.g., for IEEE std. 802.11a or 802.11g), HT (e.g., for IEEE std. 802.11n) or VHT (e.g., for IEEE std. 802.11ac) encoding, respectively. Similarly, channel spacing values 18 and 19 specify 40.0 MHz, but indicate HT and VHT encoding, respectively. Similarly, channel spacing value 20 further specifies 80.0 MHz and VHT encoding while channel spacing value 21 specifies 80+80 MHz and VHT encoding.

Figure 20:
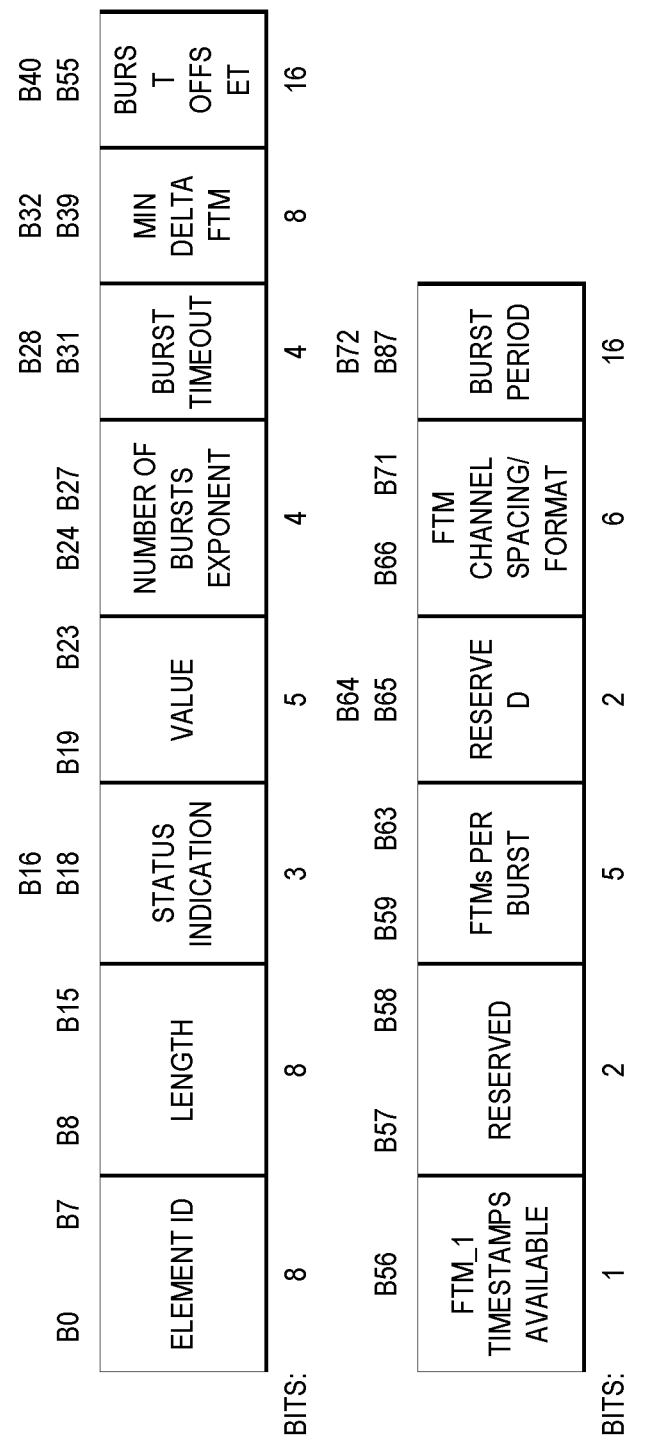
FIG. 20 shows a format for fields that may be implemented in a frame or message from first STA to a second STA to advertise a desired configuration according to an embodiment.

FIG. 20 shows a format for fields that may be implemented in a frame or message from first STA to a second STA to advertise a desired configuration according to an embodiment. In one particular implementation, one or more fields of FIG. 20 may be included in a fine timing measurement request frame. In another implementation, one or more fields of FIG. 20 may be included in an initial fine timing measurement message transmitted in response to a fine timing measurement request message. As indicated above, the field "Length" may indicate a number of bytes or octets to follow the Length field in a message or frame.

Field "Status Indication" in combination with field "Value" as implemented in a fine timing measurement frame may provide a result responsive to a fine timing measurement request frame. Field "Status Indication" may have a value as shown in TABLE V below, for example. Field Value may occupy the five least significant bits (LSBs) of the combination of fields Status Indication and Value if a value in Status Indication is set to "4."

TABLE V

| Value | Description |
| --- | --- |
| 0 | Reserved |
| 1 | Successful. Indicates FTM exchange about to begin. Accepted all fields. |
| 2 | Overriden. Indicates FTM exchange about to begin. Override of one or more fields. |
| 3 | Request incapable (do not send same request again) |
| 4 | Request failed. Do not send new request for "Value" seconds. |
| 5-7 | Reserved |

Field "Number of Bursts Exponent" may occupy the four LSBs of the byte or octet following the field "Status Indication." This may indicate a number of bursts (e.g., $2^x$) are requested (e.g., if in a fine timing measurement request frame) or allocated (e.g., if included in a fine timing measurement message). A value of "15" in a Number of Bursts Exponent field of a fine timing measurement request message may indicate no preference by the initiating STA.

As pointed out above, a field "Burst Timeout" may indicate a time of duration of a burst instance. Possible values of field Burst Timeout for a particular non-limiting example are shown in TABLE VI below.

TABLE VI

| Value | Description |
| --- | --- |
| 0 | 250 us |
| 1 | 500 us |
| 2 | 1 ms |
| 3 | 2 ms |
| 4 | 4 ms |
| 5 | 8 ms |
| 6 | 16 ms |
| 7 | 32 ms |
| 8 | 64 ms |
| 9 | 128 ms |
| 10-14 | Reserved |
| 15 | No preference |

As pointed out above, field "Min_delta_FTM" may indicate a minimum time between consecutive fine timing measurement frames in a burst of fine timing measurement frames which may be measured from a start of a fine timing measurement frame to the start of a following fine timing measurement frame. Units may be expressed in 100 μsec and a value of "0" may indicate no preference (e.g., if specified by an initiating STA in a fine timing measurement request frame).

As pointed out above, field "Burst Offset" may indicate a time duration between reception of an initial fine timing measurement request frame and a beginning of an initial burst instance (e.g., expressed in units of msec). A value of 0 for Burst Offset in a fine timing measurement request message (e.g., from an initiating STA) may indicate "as quickly as possible." A value of 65535 for Burst Offset in a fine timing measurement request message (e.g., from an initiating STA) may indicate no preference.

Field FTMs per Burst may indicate a number of measurements for a burst of fine timing measurements.

Figure 11:
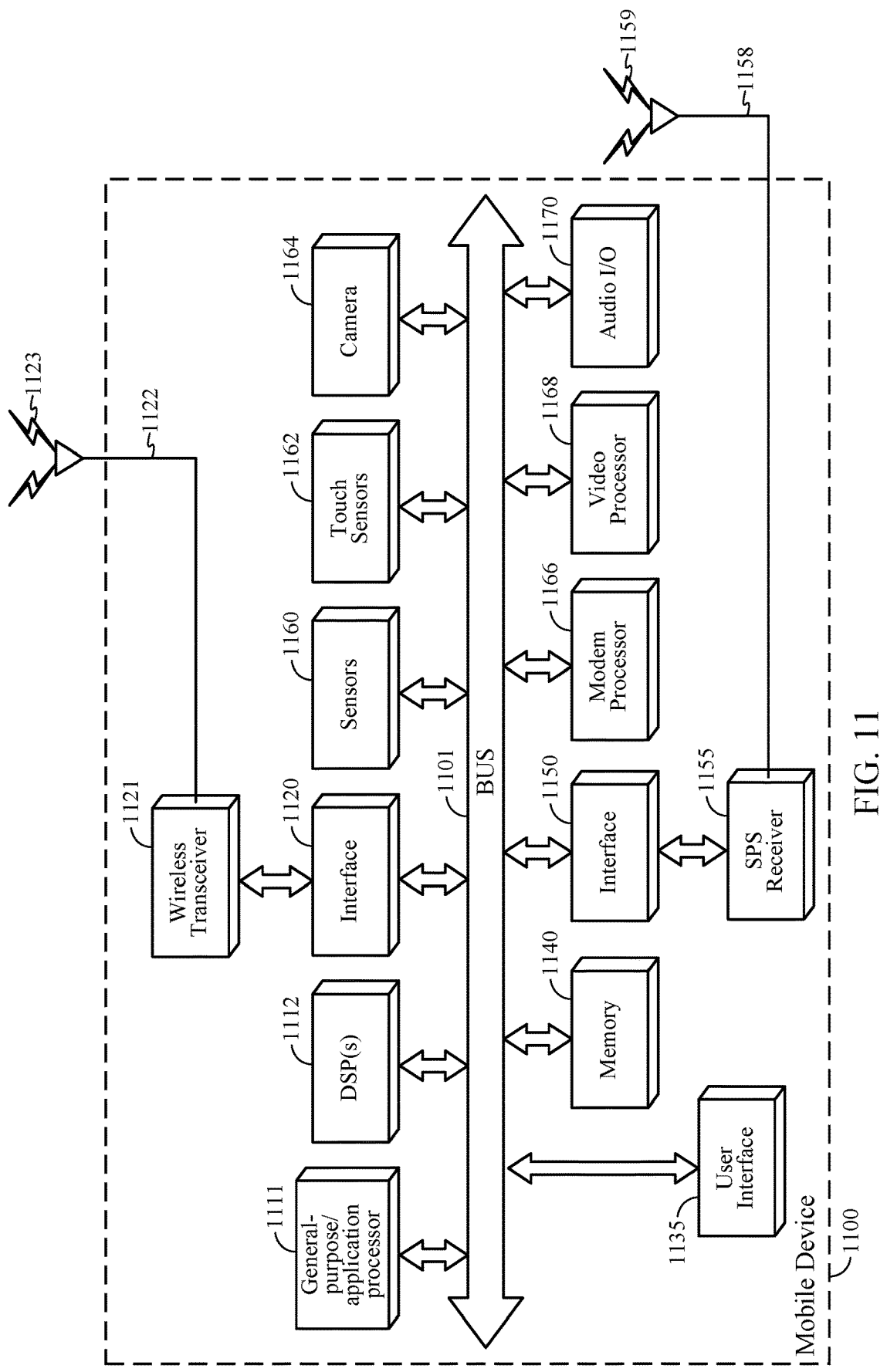
FIG. 11 is a schematic block diagram illustrating an exemplary device, in accordance with an implementation.

FIG. 11 is a schematic diagram of a mobile device according to an embodiment. Mobile device 100 (FIG. 1) may comprise one or more features of mobile device 1100 shown in FIG. 11. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 11, mobile device 1100 may comprise digital signal processor(s) (DSP(s)) 112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 5B, 5C, 5D, 5E, 6B, 6C, 6D, 6E, 6F, 6G, 6H, 6I, 6J, 6K, 6L, 6M, 9B, 9C, 10Q and 10R.

Also shown in FIG. 11, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 12:
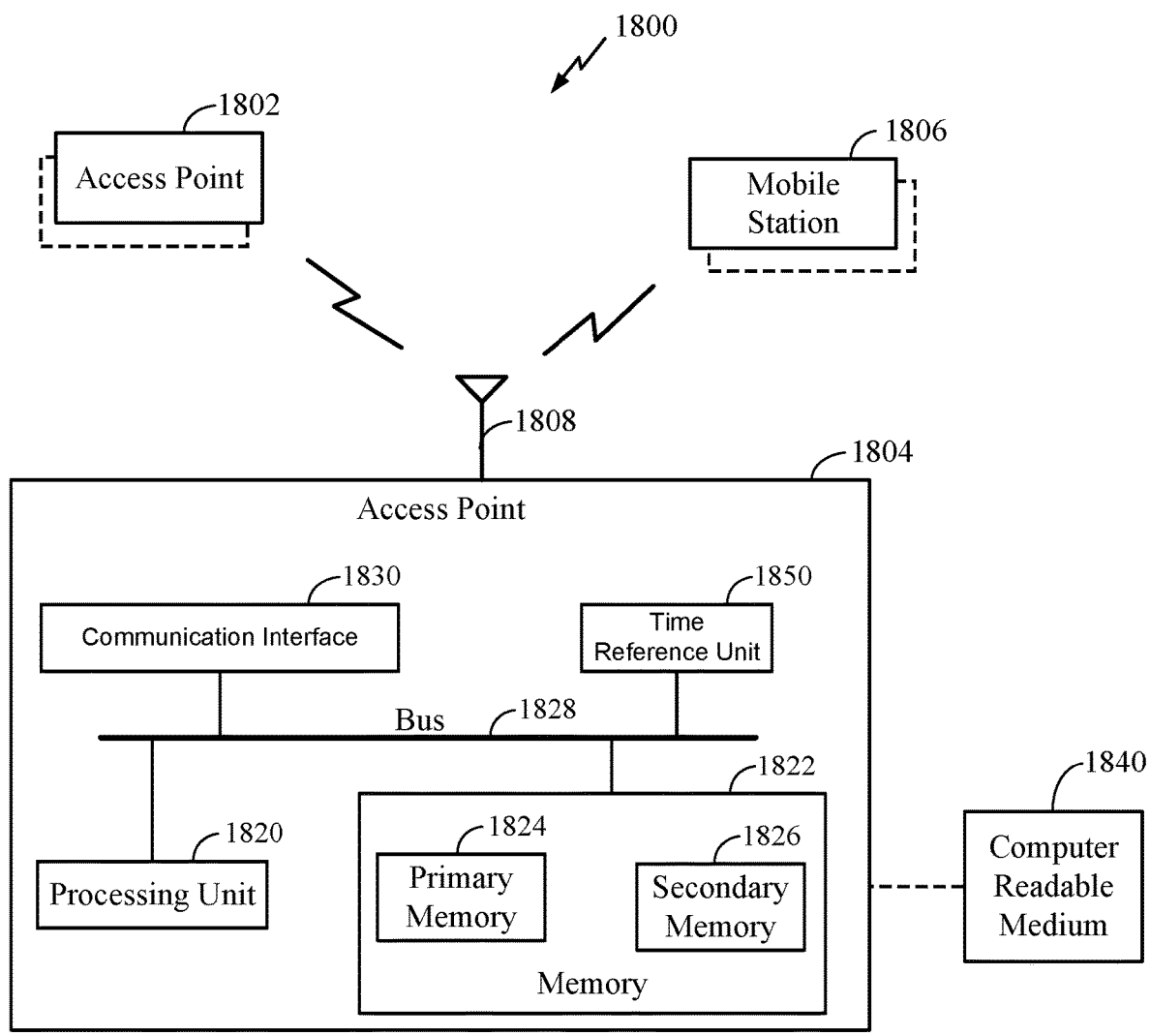
FIG. 12 is a schematic block diagram of an example computing system in accordance with an implementation.
Figure 16:
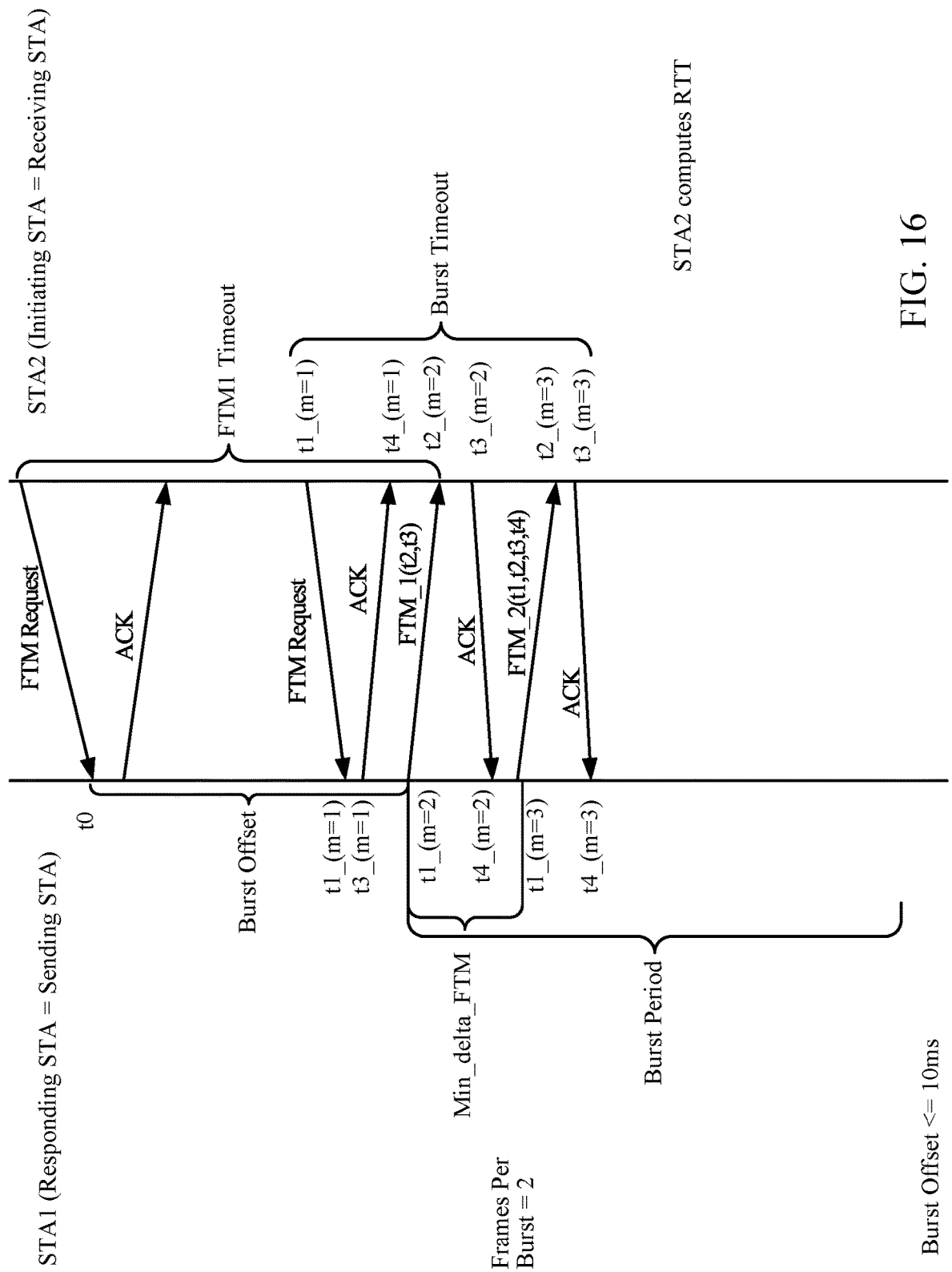
FIG. 16 is a message flow diagram illustrating the creation of multiple time stamps in response to a fine timing measurement request message.

FIG. 12 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 ay comprise and access point and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 12, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 12, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 12, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 5B, 5C, 5D, 5E, 6B, 6C, 6D, 6E, 6F, 6G, 6H, 6I, 6J, 6K, 6L, 6M, 9B, 9C, 10Q and 10R.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In a particular implementation, antenna 1808 in combination with communication interface 1830 may be used to implement transmission and reception of signals at process described above with reference to FIGS. 5B, 5C, 5D, 5E, 6B, 6C, 6D, 6E, 6F, 6G, 6H, 6I, 6J, 6K, 6L, 6M, 9B, 9C, 10Q and 10R.

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

As used herein, the term "access point" is meant to include any wireless communication station and/or device used to facilitate communication in a wireless communications system, such as, for example, a wireless local area network, although the scope of claimed subject matter is not limited in this respect. Also, as used herein, the terms "access point" and "wireless transmitter" may be used herein interchangeably. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a first wireless transceiver device:
receiving a fine timing measurement request message from a second wireless transceiver device, the fine timing measurement request message comprising one or more fields specifying a number of fine timing measurement messages requested for transmission from the first wireless transceiver device in response to the fine timing measurement request message; and in response to receipt of the fine timing measurement request message, transmitting at least one fine timing measurement message, wherein the fine timing measurement messages requested for transmission are requested for transmission in a burst of fine timing measurement messages, and wherein the fine timing measurement request message further comprises one or more fields specifying a number of bursts of fine timing measurement messages requested for transmission from the first wireless transceiver device in response to the fine timing measurement request message.

2. The method of claim 1, wherein the transmitted at least one fine timing measurement message is to be utilized to calculate a round trip time (RTT) measurement for use in a positioning operation of the second wireless transceiver device.

3. The method of claim 1, further comprising transmitting a fine timing measurement request message acknowledgement message in response to the fine timing measurement request message.

4. A first wireless transceiver device, comprising:
a transceiver to transmit messages to and receive messages from a wireless communication network; and
one or more processors configured to:
obtain a fine timing measurement request message received at the transceiver and transmitted from a second wireless transceiver device, the fine timing measurement request message comprising one or more fields specifying a number of fine timing measurement messages requested for transmission from the first wireless transceiver device in response to the fine timing measurement request message; and
in response to receipt of the fine timing request measurement message, initiate transmission of at least one fine timing measurement message through the transceiver,
wherein the fine timing measurement request message further comprises one or more fields specifying a number of bursts of fine timing measurement messages requested for transmission from the first wireless transceiver device in response to the fine timing measurement request message, and
wherein the fine timing measurement request message further comprises one or more fields specifying a number of bursts of fine timing measurement messages requested for transmission from the first wireless transceiver device in response to the fine timing measurement request message.

5. The first wireless transceiver device of claim 4, wherein the transmitted at least one fine timing measurement message is to be utilized to calculate a round trip time (RTT) measurement for use in a positioning operation of the second wireless transceiver device.

6. The first wireless transceiver device of claim 4, wherein the one or more processors are further configured to initiate transmission of a fine timing measurement request message acknowledgement message through the transceiver in response to the fine timing measurement request message.

7. A method comprising, at a second wireless transceiver device:
transmitting a fine timing measurement request message to a first wireless transceiver device, the fine timing measurement request message comprising at least one field specifying a number of fine timing measurement messages for transmission from the first wireless transceiver device; and receiving one or more fine timing measurement messages transmitted by the first wireless transceiver device based, at least in part, on the specified number of fine timing measurement messages requested for transmission from the first wireless transceiver device, wherein the number of fine timing measurement messages requested for transmission are requested for transmission in a burst of fine timing measurement messages, and wherein the fine timing measurement request message further comprises at least one field specifying a number of bursts of fine timing measurement messages requested for transmission from the first wireless transceiver device in response to the fine timing measurement request message.

8. The method of claim 7, further comprising, at the second wireless transceiver device:
utilizing the received one or more fine timing measurement messages to calculate a round trip time (RTT) measurement for use in a positioning operation of the second wireless transceiver device.

9. The method of claim 7, further comprising transmitting a fine timing measurement request message acknowledgement message in response to the fine timing measurement request message.

10. A second wireless transceiver device, comprising:
a transceiver to transmit messages to and receive messages from a wireless communication network; and
one or more processors configured to:
initiate transmission of a fine timing measurement request message to a first wireless transceiver device, the fine timing measurement request message comprising at least one field specifying a number of fine timing measurement messages requested for transmission from the first wireless transceiver device; and
obtain one or more fine timing measurement messages received from the first wireless device based, at least in part, on the specified number of fine timing measurement messages requested for transmission from the first wireless transceiver device,
wherein the requested number of fine timing measurement messages is requested for transmission in a burst of fine timing measurement messages, and
wherein the fine timing measurement request message further comprises at least one field specifying a number of bursts of fine timing measurement messages requested for transmission from the first wireless transceiver device in response to the fine timing measurement request message.

11. The second wireless transceiver device of claim 10, wherein the one or more processors are further configured to utilize the received one or more fine timing measurement messages to calculate a round trip time (RTT) measurement for use in a positioning operation of the second wireless transceiver device.

12. The second wireless transceiver device of claim 10, wherein the one or more processors are further configured to initiate transmission of a fine timing measurement request message acknowledgement message through the transceiver in response to the fine timing measurement request message.

* * * * *